(12) United States Patent
Aquino et al.

(10) Patent No.: US 10,572,877 B2
(45) Date of Patent: Feb. 25, 2020

(54) IDENTIFYING POTENTIALLY RISKY TRANSACTIONS

(71) Applicant: JPMorgan Chase Bank, N.A., New York, NY (US)

(72) Inventors: Elizabeth Polanco Aquino, Brooklyn, NY (US); Vahram Avagyan, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 862 days.

(21) Appl. No.: 14/883,480

(22) Filed: Oct. 14, 2015

(65) Prior Publication Data

US 2016/0104163 A1    Apr. 14, 2016

Related U.S. Application Data

(60) Provisional application No. 62/063,800, filed on Oct. 14, 2014.

(51) Int. Cl.
*G06Q 20/40* (2012.01)
*G06Q 40/00* (2012.01)

(52) U.S. Cl.
CPC ......... *G06Q 20/4016* (2013.01); *G06Q 40/12* (2013.12)

(58) Field of Classification Search
CPC ................................................. G06Q 20/4016
See application file for complete search history.

(56) References Cited

U.S. PATENT DOCUMENTS

| | | | | |
|---|---|---|---|---|
| 7,480,640 B1 * | 1/2009 | Elad | ....................... | G06Q 10/10 706/14 |
| 7,904,397 B2 * | 3/2011 | Fan | ........................ | G06N 20/00 706/13 |
| 7,925,578 B1 * | 4/2011 | Hong | .................... | G06Q 40/00 705/35 |

(Continued)

FOREIGN PATENT DOCUMENTS

CA        2737943 A1 *    5/2003    ........... G06K 9/6292

OTHER PUBLICATIONS

Zhi-Hua Zhou, "Ensemble Methods—Foundations and Algorithms," CRC Press, 2012 (Year: 2012).*

(Continued)

*Primary Examiner* — Abhishek Vyas
*Assistant Examiner* — William B. Bunker
(74) *Attorney, Agent, or Firm* — Greenblum & Bernstein, P.L.C.

(57) ABSTRACT

In certain embodiments, a computer-implemented method includes determining, by a processor, characteristics of a new transaction and processing, by the processor, the characteristics of the new transaction using a risk assessment model. The risk assessment model is generated using an iterative training process that processes, over time, historical transactions to train the risk assessment model based on characteristics of historical transactions and associated risk assessment analysis of the historical transactions. The method includes generating, by the processor, a risk assessment indicator for the new transaction based on processing the characteristics of the new transaction using the risk assessment model. The risk assessment indicator indicates a degree of risk of the new transaction.

19 Claims, 6 Drawing Sheets

(56) References Cited

U.S. PATENT DOCUMENTS

| | | | | |
|---|---|---|---|---|
| 8,655,817 B2* | 2/2014 | Hasey | A61B 5/00 | |
| | | | 706/45 | |
| 9,256,838 B2* | 2/2016 | Sow | G06N 20/00 | |
| 2003/0177087 A1* | 9/2003 | Lawrence | G06Q 20/04 | |
| | | | 705/38 | |
| 2005/0289089 A1* | 12/2005 | Abe | G06K 9/6256 | |
| | | | 706/12 | |
| 2009/0024505 A1* | 1/2009 | Patel | G06Q 10/00 | |
| | | | 705/35 | |
| 2009/0125463 A1* | 5/2009 | Hido | G06N 20/00 | |
| | | | 706/12 | |
| 2009/0150370 A1* | 6/2009 | Christensen | G06Q 10/10 | |
| 2009/0182696 A1* | 7/2009 | Menahem | G06K 9/6292 | |
| | | | 706/20 | |
| 2010/0191634 A1* | 7/2010 | Macy | G06Q 30/0202 | |
| | | | 705/35 | |
| 2012/0316981 A1* | 12/2012 | Hoover | G06Q 30/06 | |
| | | | 705/26.4 | |
| 2013/0346287 A1* | 12/2013 | Enzaldo | G06Q 40/02 | |
| | | | 705/38 | |
| 2014/0257122 A1* | 9/2014 | Ong | A61B 5/02405 | |
| | | | 600/515 | |
| 2015/0363490 A1* | 12/2015 | Hinchin | G06Q 40/02 | |
| | | | 707/749 | |
| 2016/0358268 A1* | 12/2016 | Verma | G06Q 40/12 | |
| 2017/0161643 A1* | 6/2017 | Hoover | G06Q 30/06 | |
| 2018/0082368 A1* | 3/2018 | Weinflash | G06Q 40/02 | |

OTHER PUBLICATIONS

Anonymous, "Ensemble Averaging (Machine Learning)," https://en.wikipedia.org, (Year: 2014).*

* cited by examiner

IDENTIFYING POTENTIALLY RISKY TRANSACTIONS

RELATED APPLICATIONS

This application claims priority to U.S. Provisional Patent Application Ser. No. 62/063,800 entitled "TRANSACTION ANALYSIS PLATFORM FOR IDENTIFYING POTENTIALLY RISKY TRANSACTIONS," filed on Oct. 14, 2014, which is hereby incorporated by reference.

TECHNICAL FIELD

This disclosure relates generally to transaction processing and, more particularly, to identifying potentially risky transactions.

BACKGROUND

Various financial institutions such as banks and other entities receive various types of financial transactions. It may be appropriate to screen these incoming transactions to identify transactions that should be blocked or otherwise reviewed prior to performing the transaction. For example, the Office of Foreign Assets Control (OFAC) and various other domestic and international regulatory bodies mandate that transactions and messages passing through various banks and other entities be screened for possible sanctions violations. Appropriately identifying from among received transactions those transactions that should not be performed presents various challenges.

SUMMARY OF EXAMPLE EMBODIMENTS

According to embodiments of the present disclosure, disadvantages and problems associated with identifying potentially risky transactions may be reduced or eliminated.

In certain embodiments, a computer-implemented method includes determining, by a processor, characteristics of a new transaction and processing, by the processor, the characteristics of the new transaction using a risk assessment model. The risk assessment model is generated using an iterative training process that processes, over time, historical transactions to train the risk assessment model based on characteristics of historical transactions and associated risk assessment analysis of the historical transactions. The method includes generating, by the processor, a risk assessment indicator for the new transaction based on processing the characteristics of the new transaction using the risk assessment model. The risk assessment indicator indicates a degree of risk of the new transaction.

Certain embodiments of the present disclosure may provide one or more technical advantages. Certain embodiments may reduce or eliminate the number of transactions incorrectly identified as being potentially risky transactions (i.e., false positives) that may be encountered using conventional techniques for identifying potentially risky transactions. Another technical advantage of certain embodiments may include reducing the number of transactions that may provoke a manual review by a human reviewer for determining whether those transactions should be blocked. Another technical advantage of certain embodiments may include reducing processing time of certain transactions. For example, by reducing the number of false positives, transactions that may otherwise have been flagged as potentially risky may proceed in a more timely fashion rather than being delayed by the review process. As a particular example, embodiments of the present disclosure may reduce the number of delays in processing payments due to an associated transaction being incorrectly identified as a potentially risky transaction.

Another technical advantage of certain embodiments may include reducing unnecessary use of processing and storage resources of the entity processing the transactions. For example, rather than waste computing resources processing false positives and storing associated data, embodiments of the present disclosure may reduce or eliminate the use of those computing resources to process and store transactions incorrectly identified as being potentially risky transactions.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION OF EXAMPLE EMBODIMENTS

Figure 1:
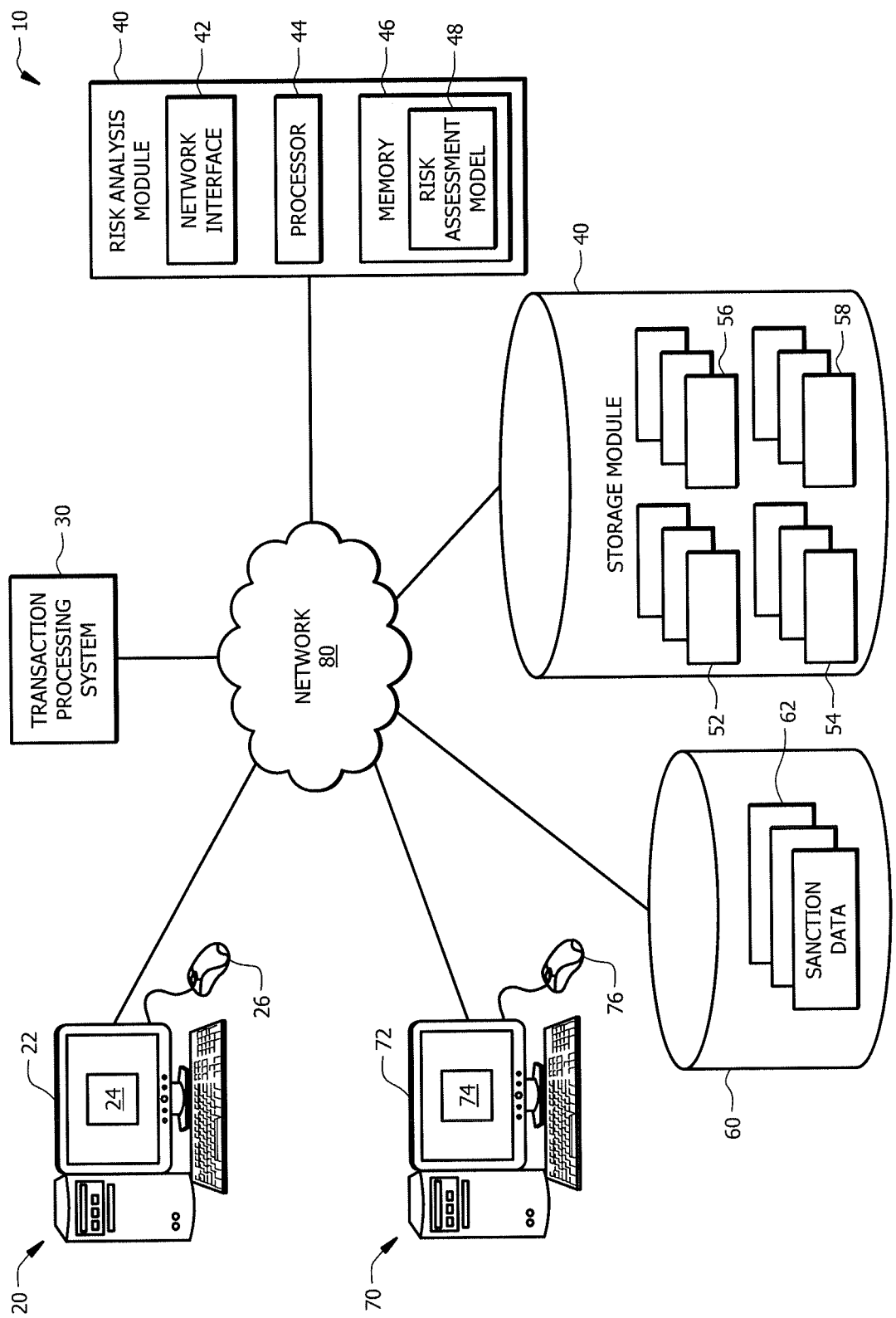
FIG. 1 illustrates a block diagram of an example system for identifying risky transactions, according to certain embodiments of the present disclosure.

Institutions (e.g., banks) that process transactions (e.g., financial transactions) receive a large number of requests to process transactions. A portion of these transactions may be sanctioned or otherwise prohibited, by government institutions or other regulatory bodies for example. As a particular example, some transactions may be sanctioned according to one or more watch lists, which may specify details related to countries in which an active embargo is in place and/or terrorist watch lists. These institutions may analyze a requested transaction to determine whether the transaction is at risk of being a sanctioned transaction. Traditionally, systems for analyzing transactions for risk have relied on simple comparisons between certain sanctions lists (e.g., watch lists) and characteristics of incoming transactions to determine if those incoming transactions should be flagged for a manual reviewer to review the transactions. These types of simple comparisons result in excessive numbers of false positives (i.e., incoming transactions being flagged as potentially risky that are not, in fact, sanctioned transactions). Additionally, conventional systems typically rely on large amounts of manual review of transactions to determine whether those transactions are potentially risky. The large number of false positives resulting from conventional systems burdens these human reviewers with unnecessary transactions to review and slows transaction processing time. As a result, human reviewers spend considerable time reviewing transactions that are ultimately determined to be legitimate, and parties to such transactions experience processing delays, as a flagged transaction will not be completed until it is reviewed and approved.

Therefore, it may be advantageous to provide a system, method, and computer-readable medium for identifying potentially risky transactions. The described embodiments provide a way for institutions (e.g., banks) that process transactions (e.g., financial transactions) to screen incoming transactions for those transactions that are potentially risky. Certain embodiments improve the accuracy of flagging potentially risky transactions by using an iterative training model (e.g., using machine learning techniques) to train a risk analysis system. Additionally, certain embodiments use fuzzy matching and other techniques when evaluating characteristics of new transactions with respect to the characteristics and risk analysis results of past transactions. Based on a risk assessment indicator (e.g., a numeric score) generated using a risk assessment model, transactions may be automatically allowed or blocked, or may be routed to a human reviewer for a final decision regarding whether to allow or block the transaction.

In certain embodiments, a computer-implemented method includes determining, by a processor, characteristics of a new transaction and processing, by the processor, the characteristics of the new transaction using a risk assessment model. The risk assessment model is generated using an iterative training process that processes, over time, historical transactions to train the risk assessment model based on characteristics of historical transactions and associated risk assessment analysis of the historical transactions. The method includes generating, by the processor, a risk assessment indicator for the new transaction based on processing the characteristics of the new transaction using the risk assessment model. The risk assessment indicator indicates a degree of risk of the new transaction.

FIG. 1 illustrates a block diagram of an example system 10 for identifying risky transactions, according to certain embodiments of the present disclosure. System 10 includes transaction entry computer system 20, transaction processing system 30, risk analysis module 40, storage module 50, storage module 60, and transaction reviewer computer system 70. Transaction entry computer system 20, transaction processing system 30, risk analysis module 40, storage module 50, storage module 60, and transaction reviewer computer system 70 may communicate over one or more networks 80.

In general, risk analysis module 40 may allow an institution (e.g., a bank) to screen incoming transactions (e.g., financial transactions) for risk in manner that takes advantage of past results of analyzing past transactions and that reduces or eliminates false positives. Risk analysis module 40 uses a risk assessment model to compare, using fuzzy matching techniques for example, characteristics of new transactions to characteristics of and approve/block decisions on past transactions to determine a risk assessment indicator for the new transactions, which provides a probability of whether the new transactions are potentially risky. Based on a risk assessment indicator (e.g., a numeric score) generated using a risk assessment model, transactions may be automatically allowed or blocked, or may be routed to a human review for a final decision regarding whether to allow or block the transaction. The risk assessment model of risk analysis module 40 may be iteratively trained, using machine learning techniques for example, based on the past results of analyzing past transactions, which may continually improve the accuracy of risk analysis module 40 in assessing the potential riskiness of new transactions.

Transaction entry computer system 20 is used to provide a transaction to system 10. For example, a banking customer or other entity may use computer system 20 to request a transaction. Transaction entry computer system 20 may include a point-of-sale device, a computer system at a banking institution (e.g., a computer used by a banking employee to enter a transaction requested by a customer), a computer system used by a banking customer to enter a transaction (e.g., a computer through which the banking customer requests a transaction, such as through a web site of the bank), or any other suitable type of computer system for entering a transaction.

A requested transaction may include a request to wire funds, a request to transfer funds, a request to withdraw funds, or any other suitable type of financial transaction that may be requested. A transaction may include a variety of characteristics, or parameters. For example, a transaction may include any suitable combination of a requesting entity (e.g., a user, a business, or a government), a destination entity (e.g., a user, a business, or a government), a geographic origin (e.g., a country), a geographic destination (e.g., a country), a transaction type, a transaction amount, one or more financial institutions (e.g., banks) associated with the transaction, and any other suitable transaction characteristics. These characteristics may facilitate not only processing the requested transaction (e.g., performing a transfer of funds from one account to another or from one requesting entity to a destination entity), but also analyzing by risk analysis module 40 the transaction for risk.

In certain embodiments, transaction processing system 30 receives requested transactions, from transaction entry computer system 20 via network 80 for example. Transaction processing system 30 is operable to process the requested transaction. For example, transaction processing system 30 is operable to perform the requested transaction. As a particular example, when a requested transaction is a request to transfer funds from one account to another account, transaction processing system 30 facilitates transferring the funds in response to the request.

Prior to performing a newly-requested transaction, transaction processing system 30 may route the requested transaction to risk analysis module 40 to determine whether the requested transaction is a potentially risky transaction. Transaction processing system 30 may receive the results of the analysis from risk analysis module 40 or a decision from transaction reviewer computer system 70, and depending on the results of the risk analysis performed or the decision received transaction processing system 30 may either perform the requested transaction or not perform the requested transaction.

Risk analysis module 40 may analyze transactions to facilitate identification of potentially risky transactions. Risk analysis module 40 represents any suitable processing device that analyzes transactions to facilitate identifying potentially risky transactions.

Risk analysis module 40 may include a network server, any suitable remote server, a mainframe, a host computer, a workstation, a web server, a personal computer, a file server, or any other suitable processing device operable to communicate with other components of system 10. In some embodiments, project heat map module 50 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of risk analysis module 40 may be performed by any suitable combination of one or more servers or other components at one or more locations. In the embodiment where risk analysis module 40 is a server, the server may be a private server, or the server may be a virtual or physical server. The server may include one or more servers at the same or remote locations. Also, risk analysis module 40 may include any suitable component that functions as a server.

In the illustrated embodiment, risk analysis module 40 includes a network interface 42, a processor 44, and a memory 46.

Network interface 42 represents any suitable device operable to receive information from network 80, transmit information through network 80, perform processing of information, communicate with other devices, or any combination of the preceding. For example, network interface 42 communicates the generated risk assessment indicator to one or more of transaction processing system 30 and transaction review computer system 70. Network interface 42 represents any port or connection, real or virtual, including any suitable hardware and/or software, including protocol conversion and data processing capabilities, to communicate through a local area network (LAN), wide area network (WAN), or other communication system that allows risk analysis module 40 to exchange information with other components of system 10. Risk analysis module 40 may include any suitable number of network interfaces 42.

Processor 44 communicatively couples to network interface 42 and memory 46, and controls the operation and administration of risk analysis module 40 by processing information received from network interface 42 and memory 46. Processor 44 includes any hardware and/or software that operates to control and process information. Processor 44 may be a programmable logic device, a microcontroller, a microprocessor, any suitable processing device, or any suitable combination of the preceding. Risk analysis module 40 may include any suitable number of processors 44.

Memory 46 stores, either permanently or temporarily, data, operational software, or other information for processor 44. Memory 46 includes any one or a combination of volatile or non-volatile local or remote devices suitable for storing information. For example, memory 46 may include RAM, ROM, magnetic storage devices, optical storage devices, or any other suitable information storage device or a combination of these devices. Risk analysis module 40 may include any suitable number of memories 46.

Memory 46 may store risk assessment model 48. Risk assessment model 48 may be implemented using any suitable combination of hardware, firmware, and software. As an example, risk assessment model 48 may be implemented as a software application. In certain embodiments, the risk assessment model of risk analysis module 40 is coded in the PYTHON programming language. The present disclosure, however, contemplates using any suitable programming language or combination of programming language for coding the risk assessment model. As just a few examples, the present disclosure contemplates coding the risk assessment model using any suitable combination of PYTHON, C, C++, JAVA, JAVASCRIPT, PERL, TCL, SMALLTALK, COMMON LISP, SCHEME, or any other suitable computer programming language.

Risk assessment model 48 is operable to perform the risk analysis operations of risk analysis module 40. For example, risk assessment model 48 analyzes new transactions to facilitate identification of potentially risky transactions and generates a respective risk assessment indicator for the new transactions. The risk assessment indicator for a transaction may be used to determine what action should be taken with respect to that transaction.

In certain embodiments, risk assessment model 48 provides a mathematical model for analyzing transactions. In general, characteristics of previously processed transactions and the associated decisions for those past transactions (e.g., approve or block) are used to create risk assessment model 48, through which new transactions are then processed. Based on the degree to which the new transactions exhibit comparable characteristics to those transactions previously identified as being risky, the new transactions can be scored to reflect their degree of risk. Thus, risk assessment model 48 acts as a filter to identify from incoming transactions those transactions that are candidates to be blocked based on their level of risk.

By way of illustration, a new transaction received by the system may have multiple characteristics, some of which may be more likely to indicate a risky transactions and others of which may indicate a non-risky transaction. Each characteristic can be scored independently (e.g., to reflect the probability that the characteristic indicator corresponds to a risky transaction), and the scores for each characteristic of the transaction can be combined (e.g., averaged) into a composite risk score. In certain embodiments, different characteristics may be assigned different weights when computing the composite score, if appropriate. Based on the composite risk score, risk assessment model determines how to process (e.g., allow, block, or escalate to manual review) the transaction associated with that score.

Risk assessment model 48 may use any suitable combination of fuzzy matching techniques, machine learning techniques, and entity disambiguation to be trained based on past transactions and to process new transactions for potential risk. Risk assessment model 48 may be trained using an iterative training process. Using machine learning techniques, for example, risk assessment model 48 may be trained based on past transactions (and their associated characteristics) and the respective decisions (e.g., allow or block) for those past transactions. To be trained, risk assessment model 48 may access information associated with past transactions (e.g., stored as historical transaction data and historical risk analysis results in storage module 50, as described below) and sanction data. As new transactions are evaluated or as sanction data is updated, risk assessment model 48 may be updated, using the machine learning techniques for example, such that risk assessment model 48 is iteratively trained to incorporate the new transactions and associated final decisions for those new transactions, as well as changes to sanction data. In other words, the ability of risk assessment model 48 to accurately assess the risk of new transactions may improve over time as risk assessment model 48 is trained.

Based on its analysis of a transaction, risk assessment model 48 may generate a risk assessment indicator, or score, for the transaction. The risk assessment indicator provides a level of riskiness of the transaction. In certain embodiments, the risk assessment indicator is a numerical value. Based on the risk assessment indicator, risk assessment model 48 may determine how the transaction should be processed. In certain embodiments, incoming transactions can be grouped into the following outcome categories based on the risk assessment indicator BLOCKED, ESCALATED, NON-RISK. A BLOCKED transaction is a transaction that should not be performed by transaction processing system 30. An ESCALATED transaction is a transaction that should be sent to a human reviewer for the human reviewer to conduct a manual review of the transaction to determine whether the transaction should be allowed or blocked. A NON-RISK transaction is a transaction that does not pose an adequate risk to either be escalated or block. In general, non-risk transactions may be allowed. Transactions with multiple decision types are labeled with the outcome of the highest risk, i.e., in the order of BLOCKED, ESCALATED, NON-RISK, from the highest to the lowest risk. These outcome categories are provided for example purposes only.

As described above, system 10 may include storage module 50, which may store historical transaction data 52, historical risk analysis results 54, new transaction data 56, and new transaction risk analysis results 58. Storage module 40 may include any one or a combination of volatile or non-volatile local or remote devices suitable for storing information. For example, storage module 50 may include random access memory (RAM), read only memory (ROM), magnetic storage devices, optical storage devices, or any other suitable information storage device or a combination of these devices. Storage module 50 may be part of or distinct from other components of system 10, such as transaction processing system 30, risk analysis module 40, storage module 60, and/or transaction reviewer computer system 70. Although storage module 50 is illustrated and described as storing particular information, a portion or all of that information may be stored in memory 46 or another suitable location. System 10 may include any suitable number of storage modules 50 and the data stored by storage module 50 may be distributed across multiple storage modules 50.

In certain embodiments, storage module 50 pushes data to risk analysis module 40 (e.g., to risk assessment model 48), transaction processing system 30, and/or transaction reviewer computer system 70. Additionally or alternatively, risk analysis module 40 (e.g., risk assessment model 48), transaction processing system 30, and/or transaction reviewer computer system 70 may access storage module 50 to collect data. For example, risk analysis module 40 (e.g., risk assessment model 48) may query storage module 50 to collect appropriate data.

Historical transaction data 52 may include data regarding past transaction that have been evaluated for risk and on which decisions (to allow or block) have been made. Historical transaction data 52 may include the characteristics of those past transactions. Risk analysis module 40 (e.g., risk assessment model 48) may access historical transaction data 52 as part of training the model of risk assessment model 48.

Historical risk analysis results 54 may include data regarding the decisions made on past transactions for which historical transaction data 52 is stored in storage module 50. For example, the data regarding decisions may include whether a particular transaction was allowed to be performed or blocked from being performed. If appropriate, historical risk analysis results 54 may include whether a particular transaction was previously escalated to a human reviewer and/or the risk assessment indicator previously determined for the transaction. Risk analysis module 40 (e.g., risk assessment model 48) may access historical risk analysis results 54 as part of training the model of risk assessment model 48.

New transaction data 56 may include may include data regarding a transaction that is being evaluated for risk by risk analysis module 40. New transaction data 56 may include the characteristics of the transaction being evaluated for risk by risk analysis module. Risk analysis module 40 (e.g., risk assessment model 48) may store in storage module 50 new transaction data 56 for a new transaction while risk analysis module 40 processes the new transaction. New transaction data 56 may be copied or moved to historical transaction data 52 when a decision (e.g., approve or block) has been made for the new transaction or at any other suitable time. This may allow the information for the new transaction to be included in the training of risk assessment model 48.

New transaction risk analysis results 58 may include data regarding the decision made on the new transaction for which new transaction data 56 is stored in storage module 50. For example, the data regarding decisions may include whether the new transaction was allowed to be performed or blocked from being performed. If appropriate, new transaction risk analysis results 58 may include whether a particular transaction was escalated to a human reviewer and/or the risk assessment indicator determined for the transaction. New transaction risk analysis results 58 may be copied or moved to historical risk analysis results 54 when a decision (e.g., approve or block) has been made for the new transaction or at any other suitable time. This may allow the information for the new transaction to be included in the training of risk assessment model 48.

As new transactions are processed, the new transaction data 56 and new transaction risk analysis results 58 for the new transactions may be added to historical transaction data 52 and historical risk analysis results 54, respectively. Over time, risk assessment model may be updated with the newly added data. For example, adding the new transaction data 56 and new transaction risk analysis results 58 for new transactions to historical transaction data 52 and historical risk analysis results 54, respectively, may allow the information for the new transactions to be included in the training of risk assessment model 48, which may improve over time the accuracy of the risk assessments performed by risk assessment model 48.

As described above, system 10 may include storage module 60, which may store sanction data 62. In certain embodiments, sanction data 62 includes watch list information regarding characteristics that are flagged by certain institutions as being risky. As a few particular examples, the watch lists may include countries, persons, organizations, or other entities that have been flagged by one or more governments or other institutions as being risky or possibly barred from using financial institutions (e.g., banks) for performing financial transactions. Storage module 60 may include any one or a combination of volatile or non-volatile local or remote devices suitable for storing information. For example, storage module 60 may include random access memory (RAM), read only memory (ROM), magnetic storage devices, optical storage devices, or any other suitable information storage device or a combination of these devices. Storage module 60 may be part of or distinct from other components of system 10, such as transaction processing system 30, risk analysis module 40, storage module 60, and/or transaction reviewer computer system 70. System 10 may include any suitable number of storage modules 60 and the data stored by storage module 60 may be distributed across multiple storage modules 60. In certain embodiments, multiple governments may publish sanction data 62.

Although storage module 60 is illustrated and described as storing particular information, a portion or all of that information may be stored in memory 46 or another suitable location. In certain embodiments, storage module 60 pushes data to risk analysis module 40 (e.g., to risk assessment model 48), transaction processing system 30, and/or transaction reviewer computer system 70. Additionally or alternatively, risk analysis module 40 (e.g., risk assessment model 48), transaction processing system 30, and/or transaction reviewer computer system 70 may access storage module 60 to collect data. For example, risk analysis module 40 (e.g., risk assessment model 48) may query storage module 60 to collect appropriate data.

System 10 includes transaction reviewer computer system 70, which may be used by a reviewer (e.g., an employee of the financial institution to which the transaction was submitted) to conduct a manual review of certain transactions to determine whether to allow or block the transactions. As described above, for example, risk assessment model 48 may determine based on the generated risk assessment identifier for a transaction, that the transaction should be routed to an appropriate reviewer so that the reviewer can make a final decision regarding whether to allow or block the transaction.

The user of transaction reviewer computer system 70 may access data stored in storage module 50, if appropriate, to review the transaction. For example, the user of transaction reviewer computer system 70 may access new transaction data 56 to review the transaction and make a final decision regarding whether to allow or block the transaction. In certain embodiments, a transaction proceeds through multiple levels of review before a final decision is made.

Once a final decision is made, the user of transaction reviewer computer system 70 may provide the decision to transaction processing system 30 and/or storage module 50. Transaction system 30 may then perform the transaction (if the decision was to allow the transaction) or not perform the transaction (if the decision was to block the transaction). Storage module 50 may update new transaction risk analysis results 58 based on the decision.

Transaction entry computer system 20 and transaction reviewer computer system 70 may be implemented using any suitable type of processing system and may include any suitable combination of hardware, firmware, and software. Transaction entry computer system 20 and transaction reviewer computer system 70 may each include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. Transaction entry computer system 20 and transaction reviewer computer system 70 may be a stand-alone computer or may be part of a larger network of computers associated with an entity.

Transaction entry computer system 20 and transaction reviewer computer system 70 may each include user display 22 and 72, respectively, which may include any suitable device operable to visually present information to a user. User displays 22 and 72 may present graphical user interfaces ("GUIs") 24 and 74, respectively, each of which may comprise a visual interface operable to allow a user to interface with transaction entry computer system 20 and transaction reviewer computer system 70, respectively. Generally, GUIs 24 and 74 provides the user with an efficient and user-friendly presentation of data provided by system 10. GUIs 24 and 74 may comprise a plurality of displays having interactive fields, pull-down lists, and buttons operated by the user. GUI 24, for example, may present a user with suitable displays for requesting a transaction. GUI 74, for example, may present a user with suitable displays for reviewing transactions for potential risk, subsequent to receiving a risk assessment indicator for the transaction for example. Further, GUIs 24 and 74 may be any graphical user interfaces, such as generic web browsers, that process information in system 10 and efficiently presents the information to the user. Transaction entry computer system 20 and transaction reviewer computer system 70 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Transaction entry computer system 20 and transaction reviewer computer system 70 may include input devices 26 and 76, respectively. Input device 26, for example, may allow a user to interact with system 10 to request a transaction. Input device 76, for example, may allow a user to interact with risk analysis module 40. Input devices 26 and 76 may comprise any user interface, such as a display, keyboard, mouse, or other appropriate terminal equipment.

Risk analysis module 40 may be implemented using any suitable type of processing system and may include any suitable combination of hardware, firmware, and software. Risk analysis module 40 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, smart phones, table computers, one or more servers, a server pool, one or more processors within these or other devices, or any other suitable processing device capable of receiving, processing, storing, and/or communicating information with other components of system 10. Risk analysis module 40 may be a stand-alone computer or may be part of a larger network of computers associated with an entity.

Network 80 facilitates any suitable combination of wireless and wireline communication. Network 80 may communicate, for example, IP packets, Frame Relay frames, Asynchronous Transfer Mode (ATM) cells, voice, video, data, and other suitable information between network addresses. Network 80 may include one or more local area networks (LANs), radio access networks (RANs), metropolitan area networks (MANs), wide area networks (WANs), mobile networks (e.g., using WiMax (802.16), WiFi (802.11), 3G, LTE, or any other suitable wireless technologies in any suitable combination), all or a portion of the global computer network known as the Internet, and/or any other communication system or systems at one or more locations, any of which may be any suitable combination of wireless and wireline.

In operation of an example embodiment of system 10, a user, such as a bank customer, may enter a transaction, such as a financial transaction, using transaction entry computer system 20. The transaction may have a plurality of transaction characteristics, or parameters. Transaction processing system 30 may receive the requested transaction and its associated transaction characteristics, via network 80 for example. Prior to performing the requested transaction, transaction processing system 30 may communicate the requested transaction to risk analysis module 40, so that risk analysis module 40 may facilitate determining whether or not transaction processing system 30 is allowed to perform that transaction.

Risk analysis module 40 (e.g., risk assessment model 48) may receive the transaction and associated characteristics and determine one or more characteristics of the transaction from the received data. Using the determined characteristics of the transaction, risk analysis module 40 (e.g., risk assessment model 48) may process the plurality of characteristics of the transaction using a risk assessment model to determine the potential riskiness of the transaction. For example, a portion of risk assessment model 48 may be generated using an iterative training process that processes, over time, historical transactions to train risk assessment model 48 based on characteristics of historical transactions and associated risk assessment analysis of the historical transactions. Risk assessment model 48 may process the characteristics of the new transaction by applying any suitable combination of fuzzy matching techniques and entity disambiguation techniques. In certain embodiments, as described in greater detail below, risk assessment model 48 may identify one or a more features of the new transaction, determine one or more classifiers for the new transaction, and determine, based on the one or more classifiers, a plurality of ensemble values for the new transaction.

Risk assessment model 48 may generate a risk assessment indicator for the new transaction based on processing the plurality of characteristics of the new transaction. The risk assessment indicator indicates a degree of risk of the transaction. In certain embodiments, the risk assessment indicator is a numerical value calculated based on the analysis of the transaction performed by risk assessment model 48. As an example, a higher value of the risk assessment indicator may indicate a higher degree of risk; however, the present disclosure contemplates the reverse (or any other suitable scoring mechanism) being implemented. In certain embodiments, risk assessment model 48 generates the risk assessment indicator by computing an average of the plurality of ensemble values.

Risk assessment model 48 may determine an appropriate action to take based on the generated risk assessment indicator. For example, based on the generated risk assessment indicator, risk assessment model 48 may determine an appropriate status of the transaction. In certain embodiments, the determined statuses include NON-RISK, ESCALATED, and BLOCKED. Although the present disclosure describes these example statuses, the present disclosure contemplates risk assessment model 48 determining any suitable statuses.

In certain embodiments, risk assessment model 48 may determine the appropriate status and corresponding action by comparing the generating risk assessment indicator to one or more thresholds. As just one example, risk assessment model 48 may maintain two thresholds, a first risk assessment threshold indicating when a transaction should be escalated for a manual review and a second risk assessment threshold indicating when a transaction should be blocked without further review.

In the example of two thresholds and available statuses of NON-RISK, ESCALATED, and BLOCKED, risk assessment model 48 may compare the generated risk assessment indicator to the first risk assessment threshold. If risk assessment model 48 determines that the risk assessment indicator does not meet the first risk assessment threshold, risk assessment model 48 may determine that the appropriate status of the transaction is NON-RISK and communicate an indication to transaction processing system 30 that prompts transaction processing system 30 to perform the requested transaction.

If risk assessment model 48 determines that the risk assessment indicator meets the first risk assessment threshold, and therefore in this example that the transaction is not a non-risk transaction, risk assessment model 48 may compare the risk assessment indicator to the second risk assessment threshold. If risk assessment model 48 determines that the risk assessment indicator does not meet the second risk assessment threshold, then risk assessment model 48 may determine that the appropriate status of the transaction is ESCALATED, which indicates in one example that the transaction should be routed to an appropriate human for a human review of the transaction to be performed. The human may review the characteristics of the transaction to determine whether or not the transaction should be blocked. As an example, transaction assessment model 48 may determine an appropriate human reviewer and transmit the transaction (or otherwise point the human user) to a transaction reviewer computer system 70.

In certain embodiments, transaction assessment model 48 may use the generated transaction assessment indicator to determine an appropriate reviewer for the particular transaction, which may improve the manner in which such transactions are routed and handled when manually reviewed. For example, having scored a particular transaction based on the probability that the transaction is risky, the transaction can be routed to a human reviewing having the appropriate qualifications/training to review such a transaction. Transaction that are relatively more likely to be risky can be routed to a relatively less experienced reviewing (as it may be relatively easier to identify whether such transactions should or should not be approved, while those transactions that are relatively less likely to be risky can be routed to relatively more experienced reviewers (as it may be relatively harder to identify whether such transactions should or should not be approved).

For example, a lower transaction assessment indicator (meeting the first risk assessment threshold but relatively close to the first risk assessment threshold) may be a transaction for which the determination of whether to block the transaction will be more difficult. Transaction assessment model 48 may thus select a more experienced human reviewer to review transactions having such a lower transaction assessment indicator. On the other hand, a higher transaction assessment indicator (meeting the first risk assessment threshold but relatively close to the second risk assessment threshold without meeting the second risk assessment threshold) may be a transaction for which the determination of whether to block the transaction will be relatively straightforward. Transaction assessment model 48 may thus select a less experienced human reviewer to review transactions having such a higher transaction assessment indicator. Various aspects of the interface used by the human reviewers (e.g., GUI 74 of transaction reviewer computer system 70) can be enhanced based on the determined risk assessment indicator, such as by highlighting various aspects of the transaction that the reviewer should investigate further.

If risk assessment model 48 determines that the risk assessment indicator for the transaction meets the second risk assessment threshold, risk assessment model 48 may determine that the appropriate status for the transaction is block. In certain embodiments, a status of BLOCKED, as determined by risk assessment model 48, may indicate that the transaction is so risky that the human review process may be bypassed. In such an embodiment, transaction analysis model 48 may communicate an indication to transaction processing system 30 that prompts transaction processing system 30 to not perform the requested transaction.

Although the comparisons to the thresholds are described as occurring in a particular order, the present disclosure contemplates the comparisons being performed in any suitable order. Furthermore, although two thresholds are described, the present disclosure contemplates system 10 using any suitable number of thresholds. For example, risk assessment model 48 may maintain a single threshold. In this example, risk assessment model 48 may not block transactions and instead may determine that transactions with a risk assessment indicator meeting the single threshold should be escalated for manual review.

Although the present disclosure describes particular techniques for determining the appropriate action to take based on the risk assessment indicator, the present disclosure contemplates system 10 using any suitable technique for determining the appropriate action.

Risk assessment model 48 may update the model based on the newly processed transaction. For example, risk assessment model 48, with the knowledge of the characteristics of the new transaction and the results of analyzing the new transaction, may train the model with this knowledge. The results of analyzing the new transaction may include the status determined for the new transaction, any decision made by a human review (if applicable), and/or any other suitable information resulting from the analysis of the transaction. Risk assessment model 48 may use any suitable techniques for training the model based on the newly processed transaction, including, for example, any suitable combination of machine learning techniques, fuzzy matching techniques, and entity disambiguation techniques.

Certain embodiments of the present disclosure may provide one or more technical advantages. Certain embodiments may reduce or eliminate the number of transactions incorrectly identified as being potentially risky transactions (i.e., false positives) that may be encountered using conventional techniques for identifying potentially risky transactions. Another technical advantage of certain embodiments may include reducing the number of transactions that may provoke a manual review by a human reviewer for determining whether those transactions should be blocked. Another technical advantage of certain embodiments may include reducing processing time of certain transactions. For example, by reducing the number of false positives, transactions that may otherwise have been flagged as potentially risky may proceed in a more timely fashion rather than being delayed by the review process. As a particular example, embodiments of the present disclosure may reduce the number of delays in processing payments due to an associated transaction being incorrectly identified as a potentially risky transaction.

Another technical advantage of certain embodiments may include reducing unnecessary use of processing and storage resources of the entity processing the transactions. For example, rather than waste computing resources processing false positives and storing associated data, embodiments of the present disclosure may reduce or eliminate the use of those computing resources to process and store transactions incorrectly identified as being potentially risky transactions.

Although system 10 is illustrated and described as having particular components and a particular configuration, the present disclosure contemplates system 10 being implemented in any suitable manner, according to particular needs. Additionally, although particular components are described as performing particular operations, the present disclosure contemplates other components of system 10 or other components performing those operations. Modifications, additions, or omissions may be made to system 10 without departing from the scope of the disclosure. For example, system 10 may include any number of transaction entry computer systems 20, transaction processing systems 30, risk analysis modules 40, storage modules 50, storage modules 60, and transaction reviewer computer systems 70. Any suitable logic may perform the functions of system 10 and the components within system 10. Additionally, although memory 46, storage module 50, and storage module 60, as well as their associated data, are illustrated and described separately, the present disclosure contemplates these components and their associated contents being combined or separated in any suitable manner, according to particular needs.

Figure 2:
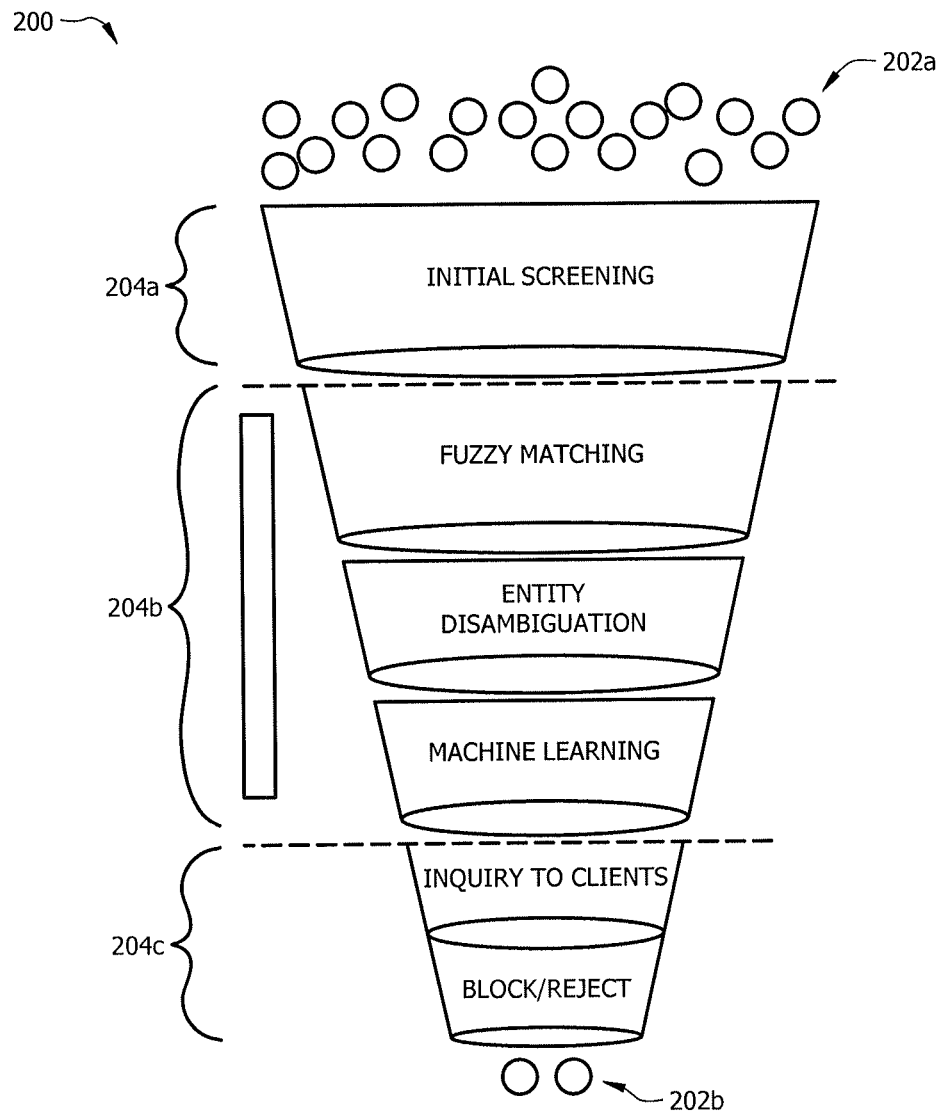
FIG. 2 illustrates an example high-level view of a filtering system for filtering transactions to identify potentially risky transactions, according to certain embodiments of the present disclosure.

FIG. 2 illustrates an example high-level view of a filtering system 200 for filtering transactions to identify potentially risky transactions, according to certain embodiments of the present disclosure. In certain embodiments, filtering system 200 is implemented by risk assessment module 48 of system 10. In one example, incoming transactions 202*a* are input to filtering system 200 for risk detection. In certain embodiments, transactions 202*a* without any detected risk may be passed through automatically. The remaining transactions 202 (i.e., transactions 202 with some detected risk) can be routed to human operators for manual review or, as described above, blocked automatically.

In one example, filtering system 200 may be subdivided into three phases, a first phase 204*a* in which an initial screening is performed, a second phase 204*b* in which automated filtering modules process the characteristics of the transaction to determine a risk assessment indicator, and a third phase 204*c* in which a manual review of certain incoming transactions 202*a* is performed based on the risk assessment indicator for those transactions 202*a* escalating those transactions 202*a* to a manual review (based on a determined degree of risk). Each of these example phases 204 is described below.

The initial screening of first phase 204*a* may include performing comparisons between data obtained from sanction data 62 (e.g., watch list data) and characteristics of transactions 202 to determine whether the characteristics match the data obtained from sanction data 62. In certain embodiments, one or more of incoming transactions 202*a* may be determined to be NON-RISK based solely on the initial screening, and those transactions 202*a* may not be subjected to the remaining filtering process. In certain embodiments, the initial screening is performed at least in part using one or more third-party (relative to the entity processing the transactions, such as a bank) services; however, the present disclosure contemplates the initial screening being provided in any suitable manner and by any suitable entity (e.g., including the entity processing the transactions, such as a bank).

The automated filtering modules of second phase 204b may include a fuzzy matching module, an entity disambiguation module, and a machine learning module. Although certain automated filtering modules are illustrated and described, the present disclosure contemplates filtering system 200 using any suitable automated filtering modules to automatically evaluate incoming transactions 202a for risk and determine suitable risk assessment indicators for those transactions 202a. Risk assessment model 48 may process characteristics of an incoming transactions 202a and data stored in storage module 50 and 60 to determine an appropriate risk assessment indicator for the incoming transaction 202a. The following description describes example techniques that may be used by risk assessment model 48 to process that information. These techniques are provided for example purposes only and should not be used to limit the present disclosure.

Various machine learning techniques may be used to analyze transactions 202 for potential risk. For example, a range of features can be constructed, such as attribute-value pairs, for each transaction 202, and a machine learning classifier can then be used to combine the features into an outcome prediction, with classifier parameters learned from a set of training data.

One or more features may be constructed, with each feature capturing or reflecting a different aspect of the risk of the transaction 202. Technologies including but not limited to feature transformation, fuzzy matching, and entity disambiguation may be used during feature extraction. In certain embodiments, one or more characteristics of the transaction 202 are presented as string values. For example, the sender and receiver of a transaction may be coded as strings in the storage module 50. In certain embodiments, these sting values are transformed to numerical values before machine learning classifiers operate on them.

For example, string features can be converted to binary attributes before being fed into a classifier. As a particular example, a receiver ID "544790012" may be fed into the classifier as a binary feature in the format of "T_RECEIVER:544790012" with a value 1. It should be understood that the original attribute name such "T_RECEIVER" can be used to represent a feature, although it will be fed to the classifier as multiple binary features.

Numeric features may be normalized before feeding into a classifier. For example, a transaction amount can be transformed into its logarithm value for classifier input. In certain embodiments, a tuple in the form of (name, transformation) may be used to represent a numerical feature with transformation. For example, ("T_NORMAMOUNT (log)", "r['T_NORMAMOUNT'] and math.log(r['T_NORMAMOUNT']) or 0.0") represents a feature with a name "T_NORMAMOUNT (log)" and a value as the logarithm of 'T_NORMAMOUNT' when it is nonzero or 0.0 when it is zero/not available.

Certain numeric features may be transformed into multiple binary features, such as by applying certain selected thresholds. For example, "transaction amount greater than $10000" is a binary feature, and $10000 is the selected threshold. The binary features become easier for a classifier to learn and often produce better, more generalizable performances. A tuple in the form of (feature, threshold), or a short-hand name "feature (threshold)" may be used to represent a binary feature transformed from a numeric feature. For example, (T_NORMAMOUNT, 10000) or 'T_NORMAMOUNT (10000)' can represent the binary feature "transaction amount greater than $10000."

Transaction hits may be compared to messages with a range of fuzzy matching algorithms. This can include the Levenshtein distance (or edit distance) that measures the difference of strings by the number of character changes, and the soundex distance that measures the difference by their phonetic differences. Each distance measure can be combined with a number of heuristic-driven cost models to compute the degrees of matching between text strings.

Levenshtein distance measures the minimal number of single-character changes, or indel changes (insertion, deletion, and substitution), that are used to convert one string to another. Levenshtein distance may be used to detect word misspelling and typographical errors. For example, to convert a word BARAKAR to the word BRAKAT, one deletion is used to remove the first A in BARAKAR (or one insertion to add an A to the second string), and one substitution is used to change the trailing R to T. Each insertion or deletion can be assigned a cost of 1.0, and each replacement a cost of 2.0. The results can be displayed as an alignment, which shows each matching position in pair. For example, the alignment of the above two strings, with '-' representing deletion, is:

BARAKAR B-RAKAT

The cost of the alignment can be computed as the total indel cost divided by twice the length of the alignment string, and can be defined as the mismatched score measured by Levenshtein distance. In the above example, the total indel cost is 3.0 and the total alignment length is 7, so the mismatched score is 3.0/(2*7)=0.214. The indel matching score can then be defined as 1 minus the mismatched score. In the above example, the indel matching score is 1−0.214=0.786.

Partial alignment of string X to string Y can be defined as the best alignment that includes complete string X but allowing partial string Y. In addition, the alignment score can be computed by applying another scoring metric sequentially: assigning each insertion or deletion a score −1.0, each match a score 1.0, each replacement a score −2.0, and keeping a 0 score if the integral score is zero or negative. The final integral score at the end of string X is the alignment score, and the maximal alignment score considering all partial Y positions is the partial alignment score. In the above example, the best partial alignment of BARAKAR to BRAKAT is:

BARAKAR B-RAKA-

The integral score at each alignment position is 1, 0, 1, 2, 3, 4, 3. In this example, the final partial alignment score is 3. The partial alignment score may be used to locate fuzzy substrings from long text.

Soundex distance measures the phonetic difference between two words when the words are pronounced in English. Soundex distance may allow the detection of minor spelling errors or language translation differences among words. The algorithm maps words to their phonetic presentation, and then measures the difference between their phonetic presentations. For example, words BARAKAR and BRAKAT are presented as 'B626' and 'B623' in the phonetic form, respectively, so they are very similar in soundex.

One or more cost models may be used to compute the degree of similarity between fuzzy-matching strings. For example, the cost models may include the above-described indel cost model, an exponential cost model, and a position insensitive sum score cost model.

The exponential cost model uses the heuristic that mismatches at the beginnings of two words are more costly than at the ends of the two words. Using the exponential costs mode, the total cost can be computed as:

$$C_p = \begin{cases} 0.0, & \text{if match exactly} \\ 1.0 - \text{sum}(\text{Match}(i) * 2^{-i} \text{ for each letter position } i), & \text{otherwise} \end{cases};$$

where Match(i) is a function that returns 1 when the two words matches at position i, or 0 otherwise. For example, to compute the exponential matching cost of the above two phonetic forms 'B626' and '13623', the positions 1, 2, 3 can be found to be matching, and position 4 is not. Also, the exponential score at each position is 0.5, 0.25, 0.125, and 0.0625. As a result, the total cost is:

Cp=1.0−sum(1*0.5,1*0.25,1*0.125,0*0.0625)=0.125.

The fuzzy matching score can then be computed as 1 minus the cost.

The position insensitive sum score cost model computes the matching score of two strings by summing up the scores of the best matching words without considering the word positions. The position insensitive sum score cost model may allow the comparison of texts even when their constituent words shift in place. For example, this model may consider BARAKAR OBAM to be a good match to OBAM, BRAKAT. By applying the indel cost model at each matching pair, a score 0.786 for the matching of "BARAKAR" to "BRAKAT" may result, and a score of 1.0 for the matching of "OBAM" to "OBAM" may result. In this example, the total position insensitive sum score is 1.786.

In certain embodiments, multiple entity disambiguation techniques can be used to differentiate transaction entities of a transaction 202. Two example entity disambiguation techniques include: 1) an address parsing algorithm to recognize country, city, and state names; and 2) algorithms to disambiguate company and vessel, and person names. In certain embodiments, the goal in entity disambiguation is not necessarily to recognize every entity name, but rather to use the results to improve fuzzy matching cost models. In general, good matching of entity names that belong to the same entity type can be more useful than occasional matching of names that belong to different entity types. For example, a vessel type hit of name "sea flower" to a transaction that is known to be related to a certain vessel should have a better matching score than the same hit to a transaction that is known to be related to a company. Similarly, different matching scores can be given to person and company name matching when the target types can be confirmed.

Dictionaries and regular expressions can be used to parse country, city, and state names from transaction messages. In one example, country, major cities, and states may be searched based on dictionaries, and regular expressions may be used to search for person name, company, and zip codes from nearby text. Company names can be confirmed by the availability of typical company title words such as CO., INTERNATIONAL, TRADING, etc., and the matching of address information such as country or state. Vessel names can be recognized by the availability of common vessel related words or vessel related tags in the transaction message, and the matching of a vessel type hit. Person names can be confirmed by the availability of common person related prefix or suffix, such as MR., MRS., DR., etc., and the matching of a person type hit.

In certain embodiments, characteristics of a transaction 202 can be categorized into simple features and derived features. Simple features and derived features are described below.

Simple features may include transaction characteristics that are already in storage module 50. For example, transaction sender (T_SENDER), receiver (T_RECEIVER), and business unit (T_BUNIT) are simple features. In some cases, the simple features can be presented in strings in their raw values. These strings can be converted into binary values before being fed into a classifier. For example, a receiver ID "544790012" may be fed to the classifier as a binary string feature in the format of "T_RECEIVER:544790012" with a value 1. Some features can have multiple values. For example, a transaction 202 can have multiple hit names. In this case, the feature may be converted to multiple binary string features before feeding into the classifier.

Derived features may include attributes that are derived from the transaction data (e.g., the characteristics of the transaction 202) using various algorithms. One example of such a derived feature may be the number of continuous words in a transaction that match the hit names. This feature has a continuous range, and may be considered a continuous feature. One or more heuristics may be used to create derived features. As a few examples, these heuristics may include 1) the strength of matching between transaction and hit names; 2) country name matches; and 3) additional information from interventions.

The review process of third phase 204c may include a user of transaction review computer system 70 reviewing transactions 202a that were assigned an adequately high risk assessment indicator to warrant a manual review of those transactions 202a to determine if those transactions 202a actually pose a risk and should be blocked. After the review process is performed, one or more transactions 202b may be blocked or otherwise rejected.

Figure 3:
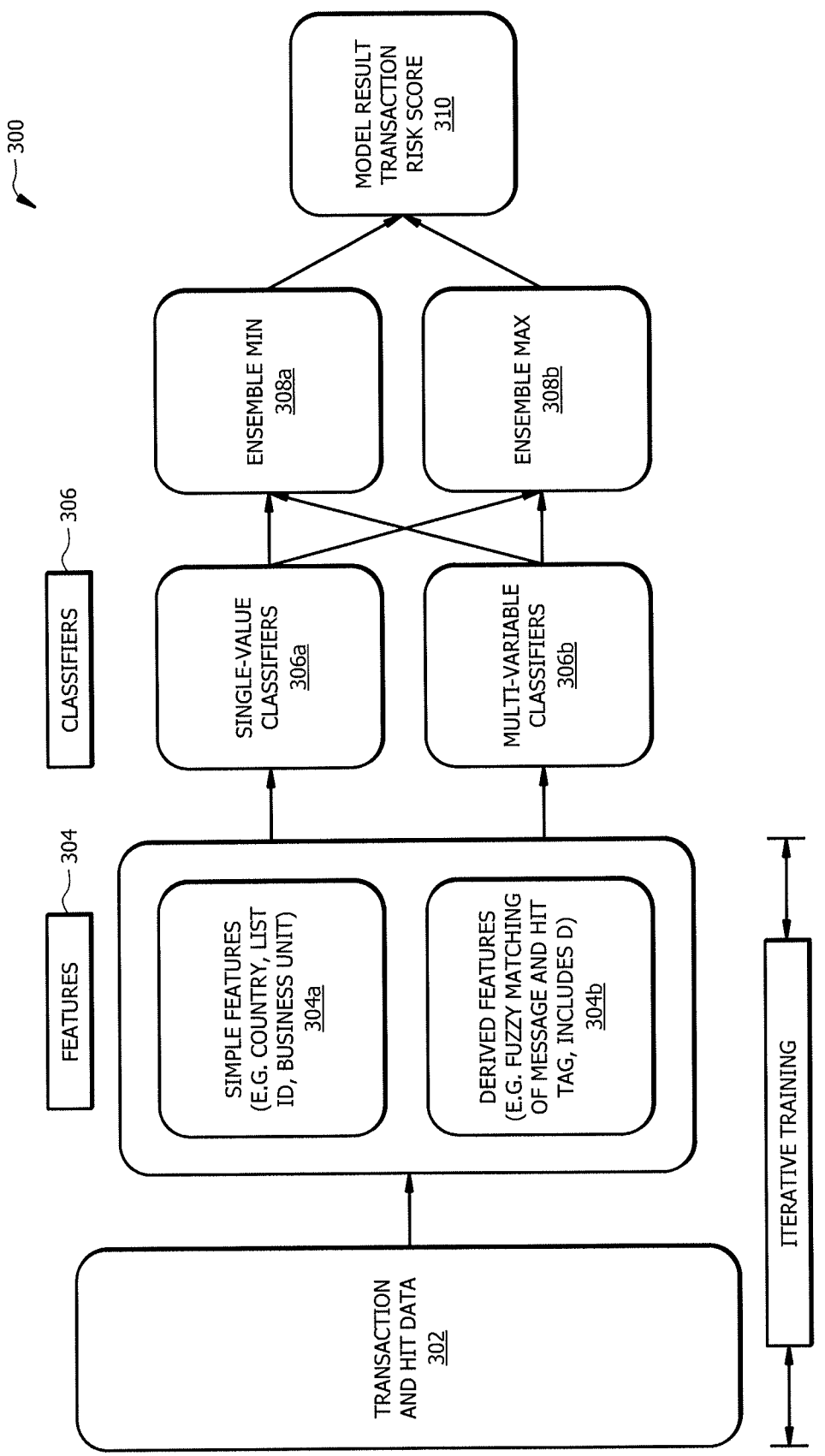
FIG. 3 illustrates an example automated filtering model, according to certain embodiments of the present disclosure.

FIG. 3 illustrates an example automated filtering model 300, according to certain embodiments of the present disclosure. In certain embodiments, risk assessment model 48 may be implemented using automated filtering model 300. Additionally, filtering model 300 provides one example of implementing filtering model 200 of FIG. 2. The implementation of automated filtering model 300 illustrated in and described with respect to FIG. 3 is provided as an example only.

Filtering model 300 may include transaction and hit data 302, features 304, classifiers 306, ensemble values 308, and risk assessment indicator 310 (also referred to as model result or transaction risk score).

Transaction and hit data 302 may include data associated with transactions 202, including both historical transactions and a new transaction 202 being processed (e.g., by risk analysis module 40. For example, the data associated with transactions 202 may include the characteristics of those transactions 202. Transaction and hit data 302 may also include the results of analyzing past transactions, including, for example, the final decision regarding whether to block or allow the transactions.

Features 304 may include characteristics derived from transactions 202. In the illustrated example, features 304 include simple features 304a and derived features 304b. As described above, simple features may include transaction characteristics that are already in storage module 50. As just a few examples, simple features 304a may include country, list ID, and/or business unit. As described above, derived features may include attributes that are derived from the transaction data (e.g., the characteristics of the transaction 202) using various algorithms.

Classifiers 306 may include single value classifiers 306a and multi-variable classifiers 306b. Filtering model 300 may use classifiers to determine what each factor indicates regarding the likelihood that the transaction 202 is risky. In certain embodiments, two types of basic classifier models are used: a Naïve Bayes model that takes in binary input variables and produces a combined probability score to indicate risk; and a logistic model that accepts continuous input variables and produces a score of risk probability.

A naive Bayes classifier may be a simple probabilistic classifier applying Bayes' theorem with strong (naive) independence assumptions.

$$p(C|F_1, \ldots, F_n) = \frac{1}{Z} p(C) \prod_{i=1}^{n} p(F_i | C)$$

A logistic model describes the probability of risk associated with a transaction as a logistic function of one or more explanatory variables, which can be discrete or continuous, and contribute linearly to the overall relative odd of risk versus non-risk outcomes.

$$p(x) = \frac{1}{1 + e^{-(\beta_0 + \beta_1 x_1 + \beta_2 x_2 + \ldots + \beta_n x_n)}}$$

Ensemble values 308 may include ensemble minimum 308a and ensemble maximum 308b. Filtering model 300 may use an ensemble of multiple classifiers. As described above, in one example, the classifiers can be either naïve Bayes or logistic classifiers (each termed a "base classifier") that are trained to capture different aspects of risks. Filtering model 300 may combine the decisions of the base classifiers and produce an overall score (i.e., a risk assessment indicator) to indicate risk. The score can be compared to a set threshold: when the score is greater than the threshold, the transaction can be escalated, otherwise it can be considered safe.

In certain implementations, the risk assessment indicator (risk score) can be computed by the model as the average of two probabilities, one representing the maximum risk probability, and another representing the minimum risk. Both the maximum and the minimum risk probabilities are summarized from a set of base classifiers. The average score still falls within the range of 0.0 and 1.0, but may not be directly interpretable in a probability sense because of averaging. The threshold for final decision can be set based on the model performance on the training data.

A base classifier can be part of the ensemble which adopts a simple model to detect a particular type of risk. For example, considering that larger transaction amount may be associated with higher risk, a base classifier can be employed to translate transaction dollar amounts into a corresponding risk probability. It can be assumed that the transaction amount distributes differently in the risky vs. safe transaction, and that such difference can be learnt from a history of observation data, which is termed training data. With this assumption, a set of training data can be used to train a classifier model, which can learn various parameters to differentiate risky vs. safe transactions, and apply the model to predict a new transaction, e.g., with any amount. As an example, the model may learn that a $10,000,000 transaction amount is associated with a 0.67 risk, while a $100 transaction amount is as associated with a 0.38 risk.

In certain embodiments, base classifiers can be categorized into five types based on their classifier structure: Univariate Naïve Bayes classifiers; Multivariate Naïve Bayes classifiers; Univariate Logistic classifiers; Multivariate Logistic classifiers; and Rule enforcement classifiers.

The following tables (Table 1, Table 2, Table 3, Table 4, and Table 5) provide example features and predicted outcomes for these example types of base classifiers. The features and predicted outcomes shown in these tables are provided for example purposes only.

TABLE 2

List of Multivariate Naïve Bayes classifiers

| # | Classifier Input Features | Predicted Outcomes |
|---|---|---|
| 1 | COUNTRY | Escalated, Blocked, Failed |
| 2 | DESIGNATION | Escalated, Blocked, Failed |
| 3 | ID_LIST | Escalated, Blocked, Failed |
| 4 | INTV_BIRTH_COUNTRY | Escalated, Blocked, Failed |
| 5 | INTV_LINKED_TO_WORDS | Escalated, Blocked, Failed |
| 6 | INTV_NATID | Escalated, Blocked, Failed |
| 7 | INTV_VESSEL_IMO | Escalated, Blocked, Failed |
| 8 | LIST_MATCHING_STRING | Escalated, Blocked, Failed |
| 9 | MSG_COUNTRY_ALL | Escalated, Blocked, Failed |
| 10 | MSG_NAME_MATCH_COUNT_NAMES | Escalated, Blocked, Failed |
| 11 | MSTG_CN2_LINE 1 | Escalated, Blocked, Failed |
| 12 | MSTG_DN2_LINE 1 | Escalated, Blocked, Failed |
| 13 | MSTG_UCP_CITY | Escalated, Blocked, Failed |
| 14 | MSTG_UDP_CITY | Escalated, Blocked, Failed |
| 15 | NAME | Escalated, Blocked, Failed |
| 16 | TAG | Escalated, Blocked, Failed |
| 17 | TYPE | Escalated, Blocked, Failed |
| 18 | T_BUNIT | Escalated, Blocked, Failed |
| 19 | T_CURRENCY | Escalated, Blocked, Failed |
| 20 | T_ENTITY | Escalated, Blocked, Failed |
| 21 | T_FROMAPPLI | Escalated, Blocked, Failed |
| 22 | T_RECEIVER | Escalated, Blocked, Failed |
| 23 | T_SENDER | Escalated, Blocked, Failed |
| 24 | T_TYPE | Escalated, Blocked, Failed |

TABLE 2

List of Univariate Naïve Bayes classifiers

| # | Classifier Input Features | Predicted Outcomes |
|---|---|---|
| | CITY, COUNTRY, DESIGNATION, HIT_C_ABBREVIATE_N, HIT_C_ABBREVIATE_SHORT, HIT_C_CONT_COUNT_N, HIT_C_CONT_MATCH_1N4, HIT_C_CONT_MATCH_1N5, HIT_C_CONT_MATCH_N, HIT_C_CONT_MATCH_N3, HIT_C_CONT_MATCH_N4, HIT_C_EXACT_MATCH_N, HIT_C_WORD_RATIO, HIT_I_CONT_MATCH_N3, HIT_I_EXACT_MATCH_N, HIT_I_NAME_MATCH30_I_C2, HIT_NAME_MATCH_SCORE, HIT_O_CONT_MATCH_N3, HIT_O_CONT_MATCH_N4, HIT_O_EXACT_MATCH_N, HIT_TAG_MATCH_LEVEL, HIT_TYPE, ID_LIST, INTV_ADDINFO_COUNTRY_SCORE, INTV_ADDRESS_MATCH_SCORE, INTV_BIRTH_COUNTRY, INTV_COMPANY_CONCEPT, INTV_COUNTRY_MATCH_SCORE, INTV_LINKED_TO, INTV_LINKED_TO_WORDS, INTV_NATID, INTV_VESSEL_IMO, LIST_MATCHING_STRING, MATCH_LEVEL, MSG_AMOUNT_FLOAT, MSG_CONT_MATCH_N, MSG_CONT_MATCH_WORDS_N4, MSG_COUNTRY_ALL, MSG_EXACT_ | Blocked |

TABLE 2-continued

List of Univariate Naïve Bayes classifiers

| # | Classifier Input Features | Predicted Outcomes |
|---|---|---|
| | MATCH_N, MSG_NAME_MATCH_COUNT_INTSTR, MSG_NAME_MATCH_COUNT_INT_10, MSG_NAME_MATCH_COUNT_INT_10C, MSG_NAME_MATCH_COUNT_INT_34, MSG_NAME_MATCH_COUNT_NAMES, MSG_NAME_MATCH_COUNT_NAMES_T, MSG_NAME_MATCH_COUNT_SCORE, MSG_NAME_MATCH_COUNT_SCOREB, MSG_VESSEL_TAG_MATCH5, MSG_VESSEL_TAG_N, MSG_VESSEL_WORD_MATCH2, MSG_VESSEL_WORD_N, MSTG_OOC_CITY, MSTG_OOC_COUNTRY, MSTG_UCP_CITY, MSTG_UCP_COUNTRY, MSTG_UDP_CITY, MSTG_UDP_COUNTRY, MSTG_UOC_CITY, MSTG_UOC_COUNTRY, NAME, OFFICIALREF, ORIGIN, RECORD_MATCHING_STRING, STATE, TAG, TYPE, T_AMOUNT, T_AMOUNT_FLOAT, T_APP_PRIORITY, T_BUNIT, T_CONFIDENTIALITY, T_COPY_SERVICE, T_CURRENCY, T_ENTITY, T_FROMAPPLI, T_GATEWAY, T_I_O, T_NATURE, T_NORMAMOUNT, T_PRIORITY, T_RECEIVER, T_RELATED_REF, T_SENDER, T_TYPE | |

TABLE 3

List of univariate logistic classifiers

| # | Feature Name | Predicted |
|---|---|---|
| 1 | HIT_C_CONT_COUNT_N (4.00) | Blocked |
| 2 | HIT_C_CONT_MATCH_1C5 (15.00) | Blocked |
| 3 | HIT_C_CONT_MATCH_1N4 (2.00) | Blocked |
| 4 | HIT_C_CONT_MATCH_1N5 (2.00) | Blocked |
| 5 | HIT_C_CONT_MATCH_N3 (3.00) | Blocked |
| 6 | HIT_C_CONT_MATCH_N4 (2.00) | Blocked |
| 7 | HIT_C_EXACT_MATCH_N (3.00) | Blocked |
| 8 | HIT_I_CONT_MATCH_N3 | Blocked |
| 9 | HIT_I_CONT_MATCH_N3 (3.00) | Blocked |
| 10 | HIT_I_EXACT_MATCH_N (3.00) | Blocked |
| 11 | HIT_I_EXACT_MATCH_N (4.00) | Blocked |
| 12 | HIT_I_NAME_MATCH30_I_C2 | Blocked |
| 13 | HIT_O_CONT_MATCH_N3 (2.00) | Blocked |
| 14 | HIT_O_CONT_MATCH_N4 (2.00) | Blocked |
| 15 | HIT_O_EXACT_MATCH_N (3.00) | Blocked |
| 16 | HIT_V_EXACT_MATCH_N (3.00) | Blocked |
| 17 | INTV_ADDINFO_COUNTRY_10I | Blocked |
| 18 | MSG_ADDR_ALL_EXACT3_N (1.00) | Blocked |
| 19 | MSG_CONT_MATCH_C (10.00) | Blocked |
| 20 | MSG_CONT_MATCH_N | Blocked |
| 21 | MSG_CONT_MATCH_N (3.00) | Blocked |
| 22 | MSG_CONT_MATCH_WORDS_N (3.00) | Blocked |
| 23 | MSG_CONT_MATCH_WORDS_N4 (2.00) | Blocked |
| 24 | MSG_EXACT_MATCH_N (2.00) | Blocked |
| 25 | MSG_NAME_MATCH_COUNT_INT | Blocked |
| 26 | MSG_NAME_MATCH_COUNT_INT_10 | Blocked |
| 27 | MSG_NAME_MATCH_COUNT_INT_10C | Blocked |
| 28 | MSG_NAME_MATCH_COUNT_INT_34 | Blocked |
| 29 | MSG_NAME_MATCH_COUNT_SCORE | Blocked |
| 30 | MSG_NAME_MATCH_COUNT_SCOREB | Blocked |
| 31 | MSG_NAME_MATCH_COUNT_SCOREB | Blocked |
| 32 | MSG_NAME_MATCH_COUNT_SCOREB | Blocked |
| 33 | MSG_NAME_MATCH_COUNT_SCOREB | Blocked |
| 34 | MSG_NAME_MATCH_COUNT_SCOREB | Blocked |
| 35 | MSG_NAME_MATCH_COUNT_SCOREB | Blocked |
| 36 | MSG_NAME_MATCH_COUNT_SCOREB | Blocked |
| 37 | MSG_NAME_MATCH_COUNT_SCOREB | Blocked |
| 38 | MSG_NAME_MATCH_COUNT_SCOREB | Blocked |
| 39 | MSG_VESSEL_TAG_MATCH5 | Blocked |
| 40 | MSG_VESSEL_WORD_MATCH2 | Blocked |
| 41 | T_NORMAMOUNT (log) | Blocked |

TABLE 4

List of multivariate logistic classifiers

| # | Feature Name | Predicted Outcomes |
|---|---|---|
| 1 | COUNTRY (NO ADDRESS), HIT_I_NAME_MATCH30_I_C2 (1.00), HIT_I_EXACT_MATCH_N (3.00) | Blocked |
| 2 | HIT_C_ABBREVIATE_N (3.00), HIT_C_CONT_MATCH_1N4 (1.00), HIT_C_EXACT_MATCH_N (1.00) | Blocked |
| 3 | HIT_C_ABBREVIATE_N (3.00), HIT_C_CONT_MATCH_1N4 (1.00), HIT_C_STR_RATIO (0.30) | Blocked |
| 4 | HIT_C_CONT_MATCH_1C5 (15.00), COUNTRY (NO ADDRESS) | Blocked |
| 5 | HIT_C_CONT_MATCH_1C5 (15.00), HIT_C_CONT_COUNT_N (2.00) | Blocked |
| 6 | HIT_C_CONT_MATCH_1C5 (15.00), HIT_C_CONT_MATCH_1N5 (2.00) | Blocked |
| 7 | HIT_C_CONT_MATCH_1C5 (15.00), INTV_COMPANY_CONCEPT (1.00) | Blocked |
| 8 | HIT_C_CONT_MATCH_1C5 (15.00), INTV_COMPANY_CONCEPT (1.00), COUNTRY (NO ADDRESS) | Blocked |
| 9 | HIT_C_CONT_MATCH_N3 (3.00), INTV_COMPANY_CONCEPT (1.00), MSG_EXACT_MATCH_N (2.00) | Blocked |
| 10 | HIT_C_CONT_MATCH_N3 (3.00), MSG_EXACT_MATCH_N (2.00) | Blocked |
| 11 | HIT_C_CONT_MATCH_N4 (1.00), MSG_ADDR_ALL_EXACT3_N (1.00), COUNTRY (NO ADDRESS), T_FROMAPPLI (GFP) | Blocked |
| 12 | HIT_I_CONT_MATCH_N3 (3.00), COUNTRY (NO ADDRESS) | Blocked |
| 13 | HIT_I_CONT_MATCH_N3 (3.00), HIT_I_EXACT_MATCH_N (3.00) | Blocked |
| 14 | HIT_I_CONT_MATCH_N3 (3.00), HIT_I_EXACT_MATCH_N (3.00), MSG_CONT_MATCH_C (8.00) | Blocked |
| 15 | HIT_I_EXACT_MATCH_N (2.00), MSG_CONT_MATCH_C (10.00) | Blocked |
| 16 | HIT_I_NAME_MATCH30_I_C2 (1.00), COUNTRY (NO ADDRESS) | Blocked |
| 17 | HIT_I_NAME_MATCH30_I_C2 (1.00), HIT_I_EXACT_MATCH_N (2.00), HIT_I_EXACT_MATCH_N (3.00), HIT_I_EXACT_MATCH_N (4.00), MSG_NAME_MATCH_COUNT_SCOREB (3.00), MSG_NAME_MATCH_COUNT_SCOREB (4.00) | Blocked |
| 18 | HIT_I_NAME_MATCH30_I_C2 (1.00), MSG_EXACT_MATCH_N (2.00) | Blocked |
| 19 | HIT_I_NAME_MATCH30_I_C2 (1.00), MSG_EXACT_MATCH_N (3.00) | Blocked |
| 20 | HIT_I_NAME_MATCH_I_CLEN (3.00), HIT_I_EXACT_MATCH_N (2.00) | Blocked |
| 21 | HIT_I_NAME_MATCH_SCORE (2.00), HIT_I_EXACT_MATCH_N (4.00) | Blocked |
| 22 | HIT_V_EXACT_MATCH_N (2.00), MSG_CONT_MATCH_N (3.00), MSG_CONT_MATCH_C (8.00) | Blocked |
| 23 | HIT_V_EXACT_MATCH_N (2.00), MSG_CONT_MATCH_N (3.00), MSG_VESSEL_TAG_N (2.00) | Blocked |

TABLE 4-continued

List of multivariate logistic classifiers

| # | Feature Name | Predicted Outcomes |
|---|---|---|
| 24 | INTV_ADDINFO_COUNTRY_SCORE, MSG_NAME_MATCH_COUNT_SCOREB | Blocked |
| 25 | INTV_LINKED_TO_WCOUNT (1.00), COUNTRY (NO ADDRESS) | Blocked |
| 26 | INTV_LINKED_TO_WCOUNT (1.00), HIT_V_EXACT_MATCH_N (1.00) | Blocked |
| 27 | INTV_LINKED_TO_WCOUNT (1.00), INTV_COMPLIANCE_N (1.00), COUNTRY (NO ADDRESS) | Blocked |
| 28 | MSG_CONT_MATCH_N (3.00), MSG_EXACT_MATCH_N (3.00) | Blocked |
| 29 | MSG_CONT_MATCH_N (4.00), MSG_EXACT_MATCH_N (2.00) | Blocked |
| 30 | MSG_CONT_MATCH_WORDS_C (25.00), MSG_EXACT_MATCH_N (3.00) | Blocked |
| 31 | MSG_CONT_MATCH_WORDS_N4 (2.00), T_FROMAPPLI (GFP) | Blocked |
| 32 | MSG_EXACT_MATCH_N (2.00), INTV_COUNTRY_HITS_N (1.00), INTV_COMPLIANCE_N (1.00) | Blocked |
| 33 | MSG_NAME_MATCH_COUNT_SCOREB, TAG (UPD) | Blocked |
| 34 | T_NORMAMOUNT (10000.00), COUNTRY (NO ADDRESS), MSG_CONT_MATCH_C (8.00) | Blocked |
| 35 | T_NORMAMOUNT (10000.00), HIT_C_CONT_MATCH_1N4 (2.00) | Blocked |
| 36 | T_NORMAMOUNT (10000.00), HIT_C_CONT_MATCH_N (3.00) | Blocked |
| 37 | T_NORMAMOUNT (10000.00), HIT_C_CONT_MATCH_N4 (2.00) | Blocked |
| 38 | T_NORMAMOUNT (10000.00), HIT_C_NAME_MATCH_C_CLEN (3.00) | Blocked |
| 39 | T_NORMAMOUNT (10000.00), HIT_C_WORD_RATIO (0.99), HIT_C_CONT_MATCH_N4 (2.00) | Blocked |
| 40 | T_NORMAMOUNT (10000.00), HIT_C_WORD_RATIO (0.99), HIT_C_CONT_MATCH_N5 (2.00) | Blocked |
| 41 | T_NORMAMOUNT (10000.00), HIT_C_WORD_RATIO (0.99), HIT_C_NAME_MATCH_C_CLEN (2.00) | Blocked |
| 42 | T_NORMAMOUNT (10000.00), HIT_C_WORD_RATIO (1.00), HIT_NAME_MATCH_SCORE (2.00) | Blocked |
| 43 | T_NORMAMOUNT (10000.00), HIT_I_CONT_MATCH_N3 (3.00) | Blocked |
| 44 | T_NORMAMOUNT (10000.00), HIT_I_EXACT_MATCH_N (3.00) | Blocked |
| 45 | T_NORMAMOUNT (10000.00), HIT_NAME_MATCH_SCORE (5.00) | Blocked |
| 46 | T_NORMAMOUNT (10000.00), HIT_O_CONT_MATCH_N3 (2.00) | Blocked |
| 47 | T_NORMAMOUNT (10000.00), INTV_COUNTRY_HITS_N (1.00) | Blocked |
| 48 | T_NORMAMOUNT (10000.00), INTV_COUNTRY_HITS_N (1.00), INTV_COMPLIANCE_N (1.00) | Blocked |
| 49 | T_NORMAMOUNT (10000.00), INTV_LINKED_TO_WCOUNT (1.00) | Blocked |
| 50 | T_NORMAMOUNT (10000.00), MSG_ADDR_ALL_EXACT3_N (1.00) | Blocked |
| 51 | T_NORMAMOUNT (10000.00), MSG_EXACT_MATCH_N (3.00) | Blocked |
| 52 | T_NORMAMOUNT (10000.00), MSG_NAME_MATCH_COUNT_SCOREB (2.00) | Blocked |
| 53 | T_NORMAMOUNT (10000.00), MSG_NAME_MATCH_COUNT_SCOREB (2.00), INTV_COMPLIANCE_N (1.00) | Blocked |
| 54 | T_NORMAMOUNT (10000.00), MSG_NAME_MATCH_COUNT_SCOREB (2.00), MSG_VESSEL_TAG_MATCH5 (1.00), MSG_VESSEL_WORD_MATCH2 (1.00) | Blocked |
| 55 | T_NORMAMOUNT (10000.00), TAG (UPD) | Blocked |
| 56 | T_NORMAMOUNT (100000.00), MSG_CONT_MATCH_WORDS_C (15.00) | Blocked |
| 57 | T_NORMAMOUNT (100000.00), MSG_CONT_MATCH_WORDS_C (8.00), INTV_ADDRESS_MATCH_SCORE (1.00) | Blocked |
| 58 | T_NORMAMOUNT (100000.00), MSG_NAME_MATCH_COUNT_INT_34 (2.00), INTV_ADDRESS_MATCH_SCORE (1.00) | Blocked |
| 59 | T_NORMAMOUNT (100000.00), MSG_NAME_MATCH_COUNT_INT_34 (2.00), INTV_COMPLIANCE_N (1.00) | Blocked |
| 60 | T_NORMAMOUNT (100000.00), MSG_NAME_MATCH_COUNT_SCOREB (2.00), INTV_COMPLIANCE_N (1.00) | Blocked |
| 61 | T_NORMAMOUNT (log), MSG_NAME_MATCH_COUNT_INT_34 (3.00) | Blocked |
| 62 | T_NORMAMOUNT (log), MSG_NAME_MATCH_COUNT_SCOREB | Blocked |

Rule enforcement classifiers may use positive samples in positive cases, and negative samples in negative cases, thus arbitrarily boosting the prediction to be about 1.0 when positive samples are seen.

TABLE 5

List of rule enforcement classifiers

| # | Feature Name | Predicted Outcomes |
|---|---|---|
| 1 | HIT_C_ABBREVIATE_N (3.00) | Blocked |
| 2 | INTV_COMPANY_CONCEPT (1.00) | Blocked |

Risk assessment indicator 310 may provide an indication of the determined possible risk of the incoming transaction 202. In certain embodiments, risk assessment indicator 310 is implemented as a score, which may be represented as a numerical value.

Figure 4:
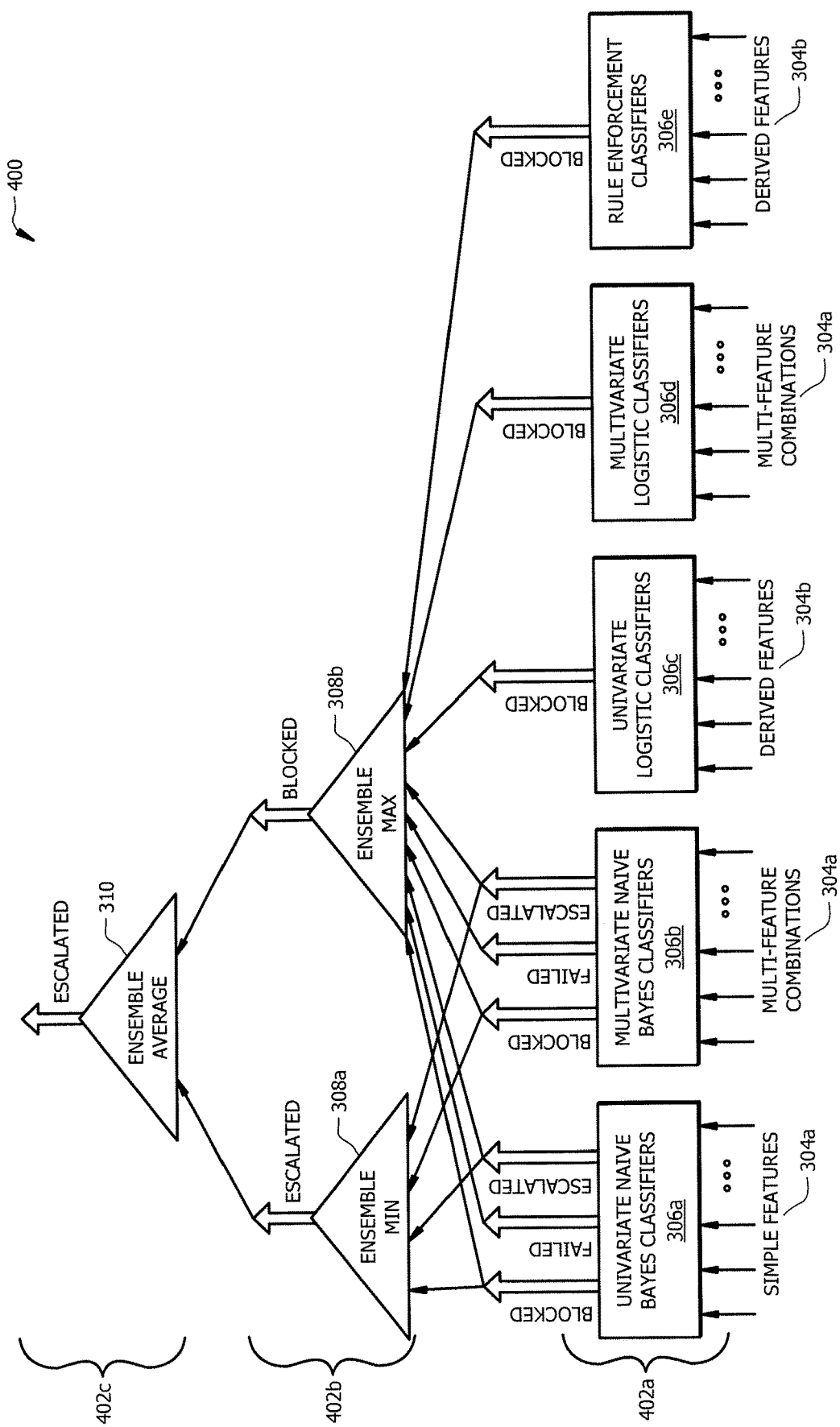
FIG. 4 illustrates an example in which the filter model of FIG. 3 comprises a hierarchical structure of multiple classifiers system, according to certain embodiments of the present disclosure.

FIG. 4 illustrates an example in which filter model 300 of FIG. 3 comprises a hierarchical structure of multiple classifiers system 400, according to certain embodiments of the present disclosure. System 400 comprises multiple layers 402 (three layers, 402a, 402b, and 402c, in this example).

Layer 402a, the bottom layer in this example, comprises base classifiers 306. Features 304, as described above, may be input to layer 402a, and the various base classifiers 306 may be determined from those features 304.

In certain embodiments, base classifiers 306 include Naive Bayes classifiers (e.g., classifiers 306a and 306b), logistic classifiers (e.g., classifiers 306c and 306d), and rule enforcement classifiers (e.g., classifiers 306e). In certain embodiments, the Naïve Bayes classifiers (e.g., classifiers 306a and 306b) can be trained for the prediction of different outcomes including BLOCKED, FAILED, and ESCALATED. In certain embodiments, the logistic classifiers can be trained to predict the BLOCKED outcome. In certain embodiments, the rule enforcement classifiers include decision tree classifiers, such as randomized decision tree classifiers. As an example, the randomized decision tree classifiers may be determined using any suitable combination of Random Forests and Extra-Trees methodologies. Although randomized decision tree classifiers and particular types of randomized decision tree classifiers are described, the present disclosure contemplates using any suitable rule enforcement classifiers. The outputs of the bottom layer classifiers serve as inputs to the classifiers of layer 302b (the middle level classifiers). Although particular types of classifiers 306 are described (e.g., Naive Bayes classifiers 306a and 306b, logistic classifiers 306c and 306d, and rule enforcement classifiers 306e), the present disclosure contemplates using any suitable types of classifiers, according to particular needs.

In the illustrated example, layer 402b (the middle layer) includes two types of ensemble classifiers 308a and 308b. Ensemble classifier 308a, termed Ensemble Max, takes as inputs the outputs of all base classifiers 306, and computes the maximum score as its output. Ensemble classifier 308b, termed Ensemble Min, takes as inputs the outputs of Naïve Bayes classifiers 306a, and 306b trained with the BLOCKED and ESCALATED outcomes, and computes the minimum score as its output.

Layer 402c (the top layer) has a final ensemble classifier (risk assessment indicator 310), termed Ensemble Average, that takes as inputs the outputs of the two middle-layer ensemble classifiers 308a and 308b, and computes the average as the final classifier output. The output of the ensemble classifier of layer 402c (risk assessment indicator 310) may be compared to a threshold for a screening decision. For example, the output of the ensemble classifier of layer 402c (risk assessment indicator 310) may be a score (e.g., having a numeric value), and that score may be compared to one or more risk assessment threshold values for the screening decision, as described above. As a particular example, if the output value meets a risk assessment threshold value, then the transaction can be stopped for operator review or prioritized higher due to its potentially risky nature. If the output value does not meet the risk assessment threshold value, then the transaction can be passed automatically (i.e., for actual transaction processing) or prioritized lower due to its risky nature (e.g., while still potentially risky, the transaction may be prioritized lower for review).

For purposes of this description and when viewing the score such that a greater value is indicative of a greater likelihood that a transaction is risky, "meeting" a threshold may include a value being greater than a threshold value or being greater than or equal to a threshold value, depending on the implementation. Alternatively, when viewing the score such that a lower value is indicative of a greater likelihood that a transaction is risky, "meeting" a threshold may include a value being lower than a threshold value or being less than or equal to a threshold value, depending on the implementation.

In certain embodiments, historical data can be used as a benchmark dataset to evaluate classifier model performance. In certain embodiments, the dataset can be divided into 50% training and 50% test data, with 50% of blocked transactions in the training data and the remaining 50% in the test data. The base classifiers (e.g., classifiers 306) and ensemble classifiers (e.g., classifiers 308 and risk assessment indicator 310) can be trained from the training data and evaluated on the test data. Sensitivity and specificity metrics may be used to evaluate the classifier model. For example, given a predictive model and a risk outcome (e.g., BLOCKED or ESCALATED), the sensitivity of the model may be the ratio of successfully predicted risks divided by the total number of risks. Specificity may be the ratio of successfully predicted non-risk cases divided by the total number of non-risk cases.

A model may depend on a decision threshold for outcome classification. By varying the decision threshold, the model can trade off the sensitivity and the specificity. Such trade-off relationship can be captured graphically by the Receiver Operating Characteristics (ROC) curve, and the Area under the Curve (AUC) of the ROC curve is a good summary of the model's overall performance.

The performance of the model for BLOCKED and ESCALATED predictions can be shown in two ROC curves, and the respective ROC AUCs can be reported. Additionally, the performances can be reported on test data. In certain embodiments, it is desirable for the model to classify all BLOCKED transaction correctly. To accomplish this, in certain embodiments, the model is configured show a sensitivity of 100% for BLOCKED predictions. The model can then be evaluated for its sensitivity and specificity in predicting ESCALATED transitions. In certain embodiments, an optimal model would have the highest specificity for ESCALATED prediction, which stands for the highest rate of NON-RISK transactions that can be passed automatically without operator review.

Figure 5:
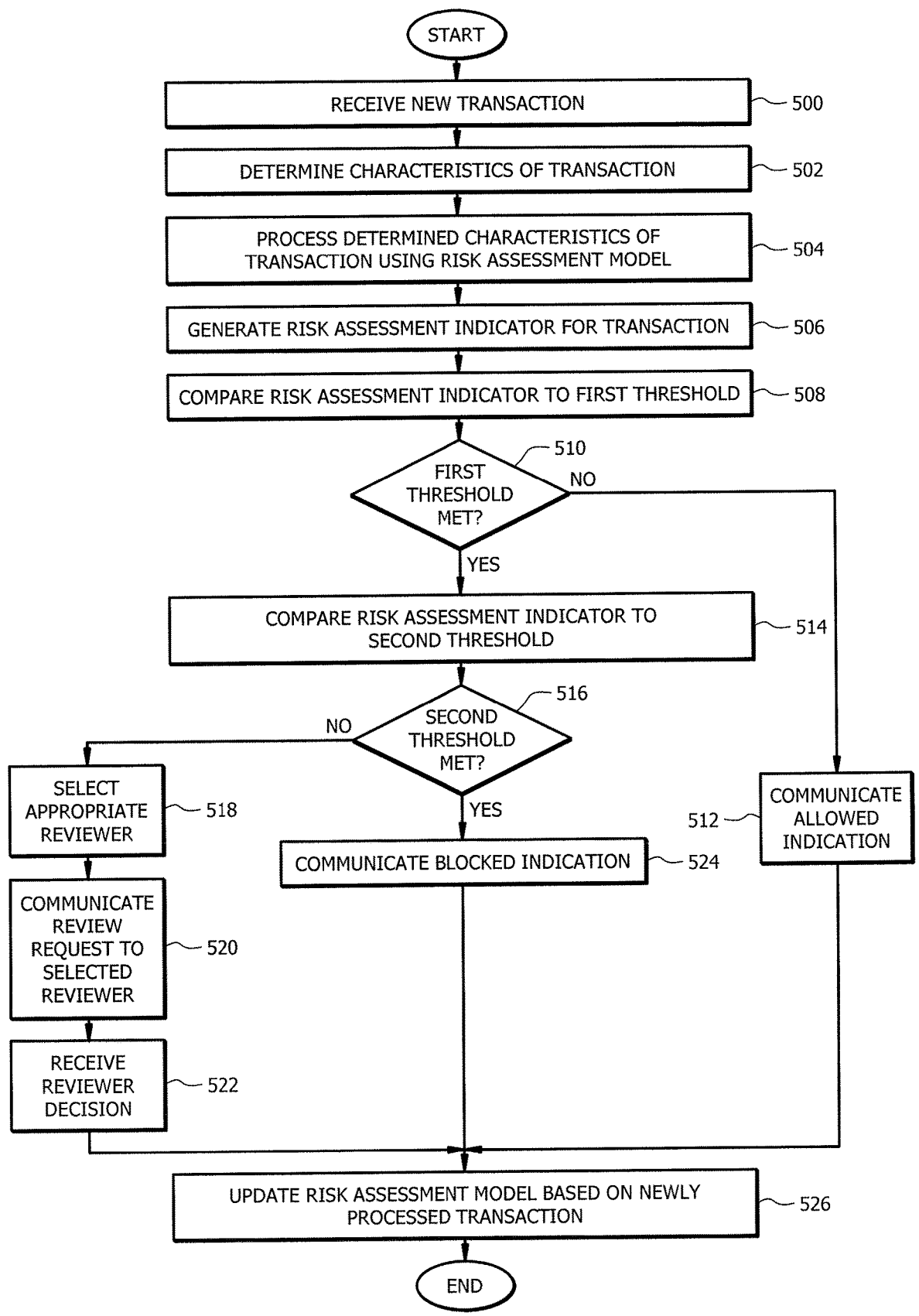
FIG. 5 illustrates an example method for identifying potentially risky transactions, according to certain embodiments of the present disclosure.

FIG. 5 illustrates an example method for identifying potentially risky transactions, according to certain embodiments of the present disclosure. The method may be implemented in any suitable combination of software, firmware, and hardware, according to particular needs. Although particular components may be identified as performing particular steps, the present disclosure contemplates any suitable components performing the steps according to particular needs.

At step 500, risk analysis module 40 (e.g., risk assessment model 48) receives a new transaction to process. For example, a user may enter a transaction using transaction entry computer system 20. The transaction may have a plurality of transaction characteristics, or parameters. Transaction processing system 30 may receive the requested transaction and its associated transaction characteristics, via network 80 for example. Prior to performing the requested transaction, transaction processing system 30 may communicate the requested transaction to risk analysis module 40.

At step 502, risk analysis module 40 (e.g., risk assessment model 48) determines one or more characteristics of the received transaction. For example, risk assessment model 48 may parse data associated with the transaction to identify characteristics of the transaction.

At step 504, using the determined characteristics of the transaction, risk analysis module 40 (e.g., risk assessment model 48) processes the characteristics of the transaction using a risk assessment model to determine the potential riskiness of the transaction. For example, a portion of risk assessment model 48 may be generated using an iterative training process that processes, over time, historical transactions to train risk assessment model 48 based on characteristics of historical transactions and associated risk assessment analysis of the historical transactions. Risk assessment model 48 may process the characteristics of the new transaction by applying any suitable combination of fuzzy matching techniques and entity disambiguation techniques. In certain embodiments, risk assessment model 48 may identify one or a more features of the new transaction, determine one or more classifiers for the new transaction, and determine, based on the one or more classifiers, a plurality of ensemble values for the new transaction.

At step 506, risk assessment model 48 generates a risk assessment indicator for the new transaction based on processing the plurality of characteristics of the new transaction. The risk assessment indicator indicates a degree of risk of the transaction. In certain embodiments, the risk assessment indicator is a numerical value calculated based on the analysis of the transaction performed by risk assessment model 48. As an example, a higher value of the risk assessment indicator may indicate a higher degree of risk; however, the present disclosure contemplates the reverse (or any other suitable scoring mechanism) being implemented. In certain embodiments, risk assessment model 48 generates the risk assessment indicator by computing an average of the plurality of ensemble values. For example, where the ensemble values are an ensemble min 308*a* and an ensemble max 308*b*, the risk assessment indicator may be calculated according to the following equation:

$$\text{risk assessment indicator} = \frac{(\text{ensemble min}) + (\text{ensemble max})}{2}$$

At steps 508-520, risk assessment model 48 determines an appropriate action to take based on the generated risk assessment indicator and initiate the action. For example, based on the generated risk assessment indicator, risk assessment model 48 may determine an appropriate status of the transaction. In certain embodiments, the determined statuses include NON-RISK, ESCALATED, and BLOCKED. Although the present disclosure describes these example statuses, the present disclosure contemplates risk assessment model 48 determining any suitable statuses.

In certain embodiments, risk assessment model 48 may determine the appropriate status and corresponding action by comparing the generating risk assessment indicator to one or more thresholds. The example method described with reference to FIG. 5 uses two thresholds to determine the appropriate action to take based on the generated risk assessment indicator. In this example, risk assessment model 48 maintains two thresholds, a first risk assessment threshold indicating when a transaction should be escalated for a manual review and a second risk assessment threshold indicating when a transaction should be blocked without further review. These thresholds may be fixed values or may be adjusted over time, based on the training of risk assessment model 48 for example.

At step 508, risk assessment model 48 may compare the generated risk assessment indicator to the first risk assessment threshold. For example, the generated risk assessment indicator may be a numeric value (e.g., a score) that is compared to a numeric first risk assessment threshold. If, based on the comparison at step 508, risk assessment model 48 determines at step 510 that the risk assessment indicator does not meet the first risk assessment threshold, risk assessment model 48 communicates at step 512 an ALLOWED indication. For example, risk assessment model 48 may conclude that because the risk assessment indicator generated for the new transaction does not meet the first risk assessment threshold, the transaction is NON-RISK and should be allowed to be performed. In certain embodiments, risk assessment model 48 may communicate an instruction to transaction processing system 30 perform the transaction, which may prompt transaction processing system 30 to perform the transaction. Risk assessment model 48 may store the decision for the new transaction (i.e., that the transaction is allowed) in storage module 50 as new transaction review results 58. The method then proceeds to step 526 for risk assessment model 48 to be updated (e.g., trained) with the new transaction information and the results of the risk assessment analysis of the new transaction.

If, based on the comparison at step 508, risk assessment model 48 determines at step 510 that the risk assessment indicator meets the first risk assessment threshold, and therefore in this example that the transaction is not a NON-RISK transaction, then at step 514 risk assessment model 48 compares the risk assessment indicator to the second risk assessment threshold. For example, the generated risk assessment indicator may be a numeric value (e.g., a score) that is compared to a numeric second risk assessment threshold.

If, based on the comparison at step 514, risk assessment model 48 determines at step 516 that the risk assessment indicator does not meet the second risk assessment threshold, then at step 518 risk assessment model 48 selects an appropriate reviewer to conduct a manual review of the new transaction. For example, based on the determination at step 510 that the risk assessment indicator meets the first risk assessment threshold (and therefore is not a NON-RISK transaction) and at step 516 that the risk assessment indicator does not meet the second risk assessment threshold (and therefore is not a automatically a BLOCKED transaction), risk assessment model 48 may determine that the new transaction is an ESCALATED transaction, which indicates in one example that the transaction should be routed to an appropriate human for a human review of the transaction to be performed.

The present disclosure contemplates risk assessment model 48 selecting the manual reviewer in any suitable manner. In certain embodiments, transaction assessment model 48 uses the generated transaction assessment indicator to select an appropriate reviewer for the new transaction. For example, a lower transaction assessment indicator (meeting the first risk assessment threshold but relatively close to the first risk assessment threshold) may be a transaction for which the determination of whether to block the transaction will be more difficult. Transaction assessment model 48 may thus select a more experienced human reviewer to review transactions having such a lower transaction assessment indicator. On the other hand, a higher transaction assessment indicator (meeting the first risk assessment threshold but relatively close to the second risk assessment threshold without meeting the second risk assessment threshold) may be a transaction for which the determination of whether to block the transaction will be relatively straightforward. Transaction assessment model 48 may thus select a less experienced human reviewer to review transactions having such a higher transaction assessment indicator.

At step 520, risk assessment model 48 communicates a review request to the selected reviewer. As an example, transaction assessment model 48 may transmit the review request to a transaction reviewer computer system 70. The transaction review request may include information regarding the transaction or otherwise point the reviewer to the transaction information. The reviewer may review the characteristics of the transaction to determine whether or not the transaction should be blocked.

At step 522, risk assessment model 48 may receive the decision of the reviewer (e.g., block or allow). For example, the human reviewer may submit the decision using reviewer computer system 70 and storage module 50 may store the decision as new transaction review results 58. The method then proceeds to step 526 for risk assessment model 48 to be updated (e.g., trained) with the new transaction information and the results of the risk assessment analysis of the new transaction.

If, based on the comparison at step 514, risk assessment model 48 determines at step 516 that the risk assessment indicator for the transaction meets the second risk assessment threshold, then at step 524 risk assessment model 48 communicates a BLOCKED indication. For example, based on the determination at step 516 that the risk assessment indicator meets the second risk assessment threshold, risk assessment model 48 may conclude that the appropriate status for the new transaction is BLOCKED. In certain embodiments, a status of BLOCKED, as determined by risk assessment model 48, may indicate that the transaction is so risky that the human review process may be bypassed. In such an embodiment, transaction analysis model 48 may communicate an indication to transaction processing system 30 that prompts transaction processing system 30 to not perform the requested transaction. Risk assessment model 48 may store the decision for the new transaction (i.e., that the transaction is blocked) in storage module 50 as new transaction review results 58. In certain other embodiments, transactions that are not determined not to be NON-RISK are transmitted to a human reviewer for review. In such embodiments, risk assessment model may perform steps analogous to steps 518 through 520 even for BLOCKED transactions.

Although the comparisons to the thresholds are described as occurring in a particular order, the present disclosure contemplates the comparisons being performed in any suitable order. Furthermore, although two thresholds are described, the present disclosure contemplates system 10 using any suitable number of thresholds. For example, risk assessment model 48 may maintain a single threshold. In this example, risk assessment model 48 may not block transactions and instead may determine that transactions with a risk assessment indicator meeting the single threshold should be escalated for manual review.

Although the present disclosure describes particular techniques for determining the appropriate action to take based on the risk assessment indicator, the present disclosure contemplates system 10 using any suitable technique for determining the appropriate action.

At step 526, risk assessment model 48 may update the model based on the newly processed transaction. For example, risk assessment model 48, with the knowledge of the characteristics of the new transaction and the results of analyzing the new transaction, may train the model with this knowledge. The results of analyzing the new transaction may include the status determined for the new transaction, any decision made by a human review (if applicable), and/or any other suitable information resulting from the analysis of the transaction. Risk assessment model 48 may use any suitable techniques for training the model based on the newly processed transaction, including, for example, any suitable combination of machine learning techniques, fuzzy matching techniques, and entity disambiguation techniques.

Modifications, additions, or omissions may be made to the method depicted in FIG. 10. The method may include more, fewer, or other steps. Additionally, steps may be performed serially or in parallel, and in any suitable order. While certain components are described as performing particular steps, the present disclosure contemplates other components of system 10 or other components performing one or more steps of the method.

Figure 6:
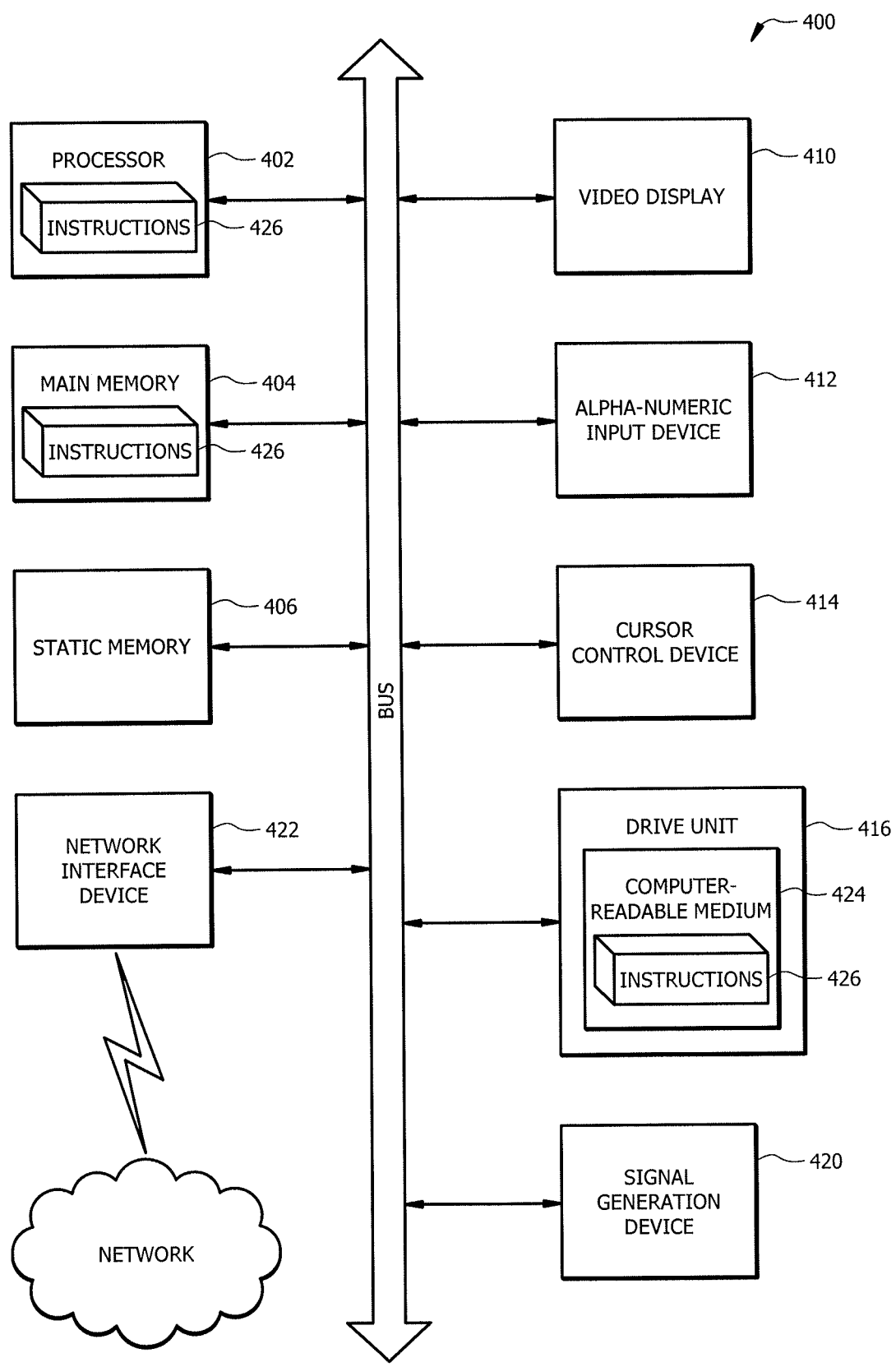
FIG. 6 illustrates computer system within which a set of instructions, for causing the machine to perform any one or more of the methodologies described herein, may be executed, according to certain embodiments of the present disclosure.

FIG. 6 illustrates computer system within which a set of instructions, for causing the machine to perform any one or more of the methodologies described herein, may be executed, according to certain embodiments of the present disclosure. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies described herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps described herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications fall within the scope of the appended claims.

What is claimed is:

1. A computer-implemented method, comprising:
   determining, by a processor, a plurality of characteristics of a new transaction;
   processing, by the processor, the plurality of characteristics of the new transaction using a risk assessment model, the risk assessment model generated using an iterative training process that processes, over time, historical transactions to train the risk assessment model based on characteristics of historical transactions and associated risk assessment analysis of the historical transactions;
   transforming, by the processor, each of the plurality of characteristics of the new transaction into a corresponding numerical value; and
   generating, by the processor, a risk assessment indicator for the new transaction based on the corresponding numerical value for each of the plurality of characteristics of the new transaction, the risk assessment indicator indicating a degree of risk of the new transaction,
   wherein processing, by the processor, the plurality of characteristics of the new transaction using the risk assessment model comprises:
   identifying, based on the plurality of characteristics of the new transaction, a set of classifiers, wherein each classifier of the set of classifiers corresponds to at least one of the characteristics of the new transaction and represents an aspect of risk associated with the new transaction, and wherein, using each classifier, the corresponding numerical value for each of the plurality of characteristics of the new transaction is generated; and
   determining, based on the set of classifiers, a plurality of ensemble values for the new transaction,
   and wherein generating the risk assessment indicator comprises:
   using each classifier from among the set of classifiers for detecting a risk probability of one of the characteristics of the new transaction, wherein the risk probability is represented by one of the ensemble values;
   determining, from the plurality of ensemble values, an ensemble maximum value and an ensemble minimum value, wherein such values comprise, respectively, a maximum risk probability and a minimum risk probability with respect to the set of classifiers; and
   averaging the maximum risk probability and the minimum risk probability.

2. The computer-implemented method of claim 1, further comprising generating the risk assessment model using the iterative training process, the iterative training process comprising applying machine learning techniques that train the risk assessment model over time and based on the historical transactions.

3. The computer-implemented method of claim 1, wherein processing, by the processor, the plurality of characteristics of the new transaction using the risk assessment model comprises applying one or more of the following:
   fuzzy matching techniques; and
   entity disambiguation techniques.

4. The computer-implemented method of claim 1, wherein generating, by the processor, the risk assessment indicator further comprises computing an average of the plurality of ensemble values.

5. The computer-implemented method of claim 1, wherein the risk assessment indicator comprises a numeric value.

6. The computer-implemented method of claim 1, further comprising updating the risk assessment model based on the new transaction.

7. The computer-implemented method of claim 1, further comprising:
   comparing a value of the risk assessment indicator for the new transaction to a first risk assessment threshold value;
   and automatically escalating, in response to determining that the value of the risk assessment indicator is greater than or equal to the first risk assessment threshold value, the new transaction to a human review process in which the new transaction is assigned to a human reviewer for review of the new transaction.

8. The computer-implemented method of claim 7, further comprising:
   comparing the value of the risk assessment indicator for the new transaction to a second risk assessment threshold value; and
   automatically blocking, in response to determining that the value of the risk assessment indicator is greater than or equal to the second risk assessment threshold value, the transaction.

9. The computer-implemented method of claim 1, further comprising:
   comparing a value of the risk assessment indicator for the new transaction to a risk assessment threshold value; and
   automatically approving, in response to determining that the value of the risk assessment indicator is less than the risk assessment threshold value, the transaction.

10. A system comprising:
    a memory storing a risk assessment model, the risk assessment model generated using a machine learning process that processes, over time, historical transactions; and
    a processor, communicatively coupled to the memory, operable to perform operations comprising:
    determining a plurality of characteristics of a new transaction;
    processing the plurality of characteristics of the new transaction using a risk assessment model, the risk assessment model generated using an iterative training process that processes, over time, historical transactions to train the risk assessment model based on characteristics of historical transactions and associated risk assessment analysis of the historical transactions;
    transforming each of the plurality of characteristics of the new transaction into a corresponding numerical value; and
    generating a risk assessment indicator for the new transaction based on the corresponding numerical value for each of the plurality of characteristics of the new transaction, the risk assessment indicator indicating a degree of risk of the new transaction,
    wherein the processor is further operable to process the plurality of characteristics of the new transaction using the risk assessment model by:
    identifying, based on the plurality of characteristics of the new transaction, a set of classifiers, wherein each classifier of the set of classifiers corresponds to at least one of the characteristics of the new transaction and represents an aspect of risk associated with the new transaction, and wherein, using each classifier, the corresponding numerical value for each of the plurality of characteristics of the new transaction is generated;

determining, based on the set of classifiers, a plurality of ensemble values for the new transaction;

using each classifier from among the set of classifiers for detecting a risk probability of one of the characteristics of the new transaction, wherein the risk probability is represented by one of the ensemble values;

determining, from the plurality of ensemble values, an ensemble maximum value and an ensemble minimum value, wherein such values comprise, respectively, a maximum risk probability and a minimum risk probability with respect to the set of classifiers; and averaging the maximum risk probability and the minimum risk probability.

11. The system of claim 10, wherein the processor is further operable to generate the risk assessment model using the iterative training process, the iterative training process comprising applying machine learning techniques that train the risk assessment model over time and based on the historical transactions.

12. The system of claim 10, wherein the processor is further operable to process the plurality of characteristics of the new transaction using the risk assessment model by applying one or more of the following:
fuzzy matching techniques; and
entity disambiguation techniques.

13. The computer-implemented method of claim 10, wherein generating the risk assessment indicator comprises computing an average of the plurality of ensemble values.

14. The computer-implemented method of claim 10, wherein the risk assessment indicator comprises a numeric value.

15. The system of claim 10, wherein the processor is further operable to perform operations comprising updating the risk assessment model based on the new transaction.

16. The system of claim 10, wherein the processor is further operable to perform operations comprising:
comparing a value of the risk assessment indicator for the new transaction to a first risk assessment threshold value; and
automatically escalating, in response to determining that the value of the risk assessment indicator is greater than or equal to the first risk assessment threshold value, the new transaction to a human review process in which the new transaction is assigned to a human reviewer for review of the new transaction.

17. The system of claim 16, wherein the processor is further operable to perform operations comprising:
comparing the value of the risk assessment indicator for the new transaction to a second risk assessment threshold value; and
automatically blocking, in response to determining that the value of the risk assessment indicator is greater than or equal to the second risk assessment threshold value, the transaction.

18. The system of claim 10, wherein the processor is further operable to perform operations comprising:
comparing a value of the risk assessment indicator for the new transaction to a risk assessment threshold value; and
automatically approving, in response to determining that the value of the risk assessment indicator is less than the risk assessment threshold value, the transaction.

19. A non-transitory computer readable medium storing instructions that, when executed by a processor, cause the processor to perform operations comprising:
determining a plurality of characteristics of a new transaction;
processing the plurality of characteristics of the new transaction using a risk assessment model, the risk assessment model generated using an iterative training process that processes, over time, historical transactions to train the risk assessment model based on characteristics of historical transactions and associated risk assessment analysis of the historical transactions;
transforming each of the plurality of characteristics of the new transaction into a corresponding numerical value; and
generating a risk assessment indicator for the new transaction based on the corresponding numerical value for each of the plurality of characteristics of the new transaction, the risk assessment indicator indicating a degree of risk of the new transaction,
wherein the processing the plurality of characteristics of the new transaction using the risk assessment model comprises:
identifying, based on the plurality of characteristics of the new transaction, a set of classifiers, wherein each classifier of the set of classifiers corresponds to at least one of the characteristics of the new transaction and represents an aspect of risk associated with the new transaction, and wherein, using each classifier, the corresponding numerical value for each of the plurality of characteristics of the new transaction is generated; and
determining, based on the set of classifiers, a plurality of ensemble values for the new transaction,
and wherein generating the risk assessment indicator comprises:
using each classifier from among the set of classifiers for detecting a risk probability of one of the characteristics of the new transaction, wherein the risk probability is represented by one of the ensemble values;
determining, from the plurality of ensemble values, an ensemble maximum value and an ensemble minimum value, wherein such values comprise, respectively, a maximum risk probability and a minimum risk probability with respect to the set of classifiers; and
averaging the maximum risk probability and the minimum risk probability.

* * * * *